US012800525B2

(12) United States Patent
Murata et al.

(10) Patent No.: US 12,800,525 B2
(45) Date of Patent: Nov. 17, 2026

(54) SIGNAL PROCESSING METHOD, SIGNAL PROCESSING DEVICE, RADIATION DETECTION APPARATUS AND RECORDING MEDIUM

(71) Applicant: HORIBA, LTD., Kyoto (JP)

(72) Inventors: Shunsuke Murata, Kyoto (JP); Ildar Valiev, Kyoto (JP)

(73) Assignee: HORIBA, LTD., Kyoto (JP)

( * ) Notice: Subject to any disclaimer, the term of this patent is extended or adjusted under 35 U.S.C. 154(b) by 468 days.

(21) Appl. No.: 18/682,769

(22) PCT Filed: Aug. 12, 2022

(86) PCT No.: PCT/JP2022/030812
§ 371 (c)(1),
(2) Date: Feb. 9, 2024

(87) PCT Pub. No.: WO2023/017866
PCT Pub. Date: Feb. 16, 2023

(65) Prior Publication Data
US 2025/0130184 A1 Apr. 24, 2025

(30) Foreign Application Priority Data
Aug. 13, 2021 (JP) ................................ 2021-131966

(51) Int. Cl.
*G01T 1/17* (2006.01)
*G01N 23/223* (2006.01)

(52) U.S. Cl.
CPC ............. *G01N 23/223* (2013.01); *G01T 1/17* (2013.01)

(58) Field of Classification Search
CPC ........ G01N 23/223; G01T 1/17; G01T 1/2928
See application file for complete search history.

(56) References Cited

U.S. PATENT DOCUMENTS 4,612,443 A * 9/1986 Alcidi ........................ G01T 1/17 250/362
2013/0275087 A1* 10/2013 Scott ......................... G01J 1/42 702/189
2016/0116615 A1 4/2016 Statham

FOREIGN PATENT DOCUMENTS

JP S53-40574 A 4/1978
JP 6550376 B2 7/2019
WO 2008157734 A2 12/2008

OTHER PUBLICATIONS

Extended European Search Report, mailed Jun. 16, 2025, which was issued for the corresponding European Patent Application No. 22855928.2.

(Continued)

*Primary Examiner* — Kiho Kim
(74) *Attorney, Agent, or Firm* — LUCAS & MERCANTI, LLP

(57) ABSTRACT

A signal processing method for processing a signal including a response wave generated in response to detection of radiation, includes: measuring a feature corresponding to a duration of a response wave or a response wave group composed of a plurality of response waves; counting, for each wave height, the number of response waves or response wave groups whose measured features are included in a predetermined first range in which a feature of a single response wave is included; and performing correction processing of subtracting a specific value from a counted number according to a response wave or a response wave group whose feature is not included in the first range.

14 Claims, 27 Drawing Sheets

(56) References Cited

OTHER PUBLICATIONS

Blaj, G. et al.: “Optimal Pulse Processing, Pile-Up Decomposition, and Applications of Silicon Drift Detectors at LCLS”, IEEE Transactions on Nuclear Science, IEEE, USA, Nov. 1, 2017, vol. 64, No. 11, pp. 2854-2868.
International Search Report for the corresponding International Application No. PCT/JP2022/030812, mailed Nov. 1, 2022, with English translation, 5 pages.
Yu J. et al., “Sum peak probability estimation in radiation measurement” Measurement, vol. 174, 109023, pp. 1-6, Section 2-4, Fig.2, Jan. 18, 2021.
Jordanov V. T., Pile-up Rejection Using Pulse-Shape Discrimination, 2018 IEEE Nuclear Science Symposium and Medical Imaging Conference Proceedings (NSS/MIC), pp. 1-4, Section II.-III., Figs. 2,5, Sep. 5, 2019.
Sjoland K.A. et al., “Pile-up and defective pulse rejection by pulse shape discrimination in surface barrier detectors”, Nuclear Instruments and Methods in Physics Research B, vol. 94, pp. 333-337, Section 2-4, Nov. 30, 1994.

* cited by examiner

SIGNAL PROCESSING METHOD, SIGNAL PROCESSING DEVICE, RADIATION DETECTION APPARATUS AND RECORDING MEDIUM

REFERENCE TO RELATED APPLICATIONS

This application is the national phase under 35 U. S. C. § 371 of PCT International Application No. PCT/JP2022/030812 which has an International filing date of Aug. 12, 2022 and designated the United States of America, which, in turn, claimed the priority of Japanese Patent Application No. 2021-131966 filed on Aug. 13, 2021.

The present invention relates to a signal processing method, a signal processing device, a radiation detection apparatus and a computer program for processing a signal generated by detection of radiation.

BACKGROUND ART

A radiation detection apparatus for detecting radiation such as X-rays is equipped with a radiation detector and a signal processing device for processing a signal output by the radiation detector. The radiation detector, which is composed of a semiconductor radiation detecting element or the like, generates a response wave such as a staircase wave, a pulse wave or the like every time radiation is detected. The signal processing device measures the wave height of the response wave. The wave height of the response wave corresponds to the energy of radiation.

The response wave spreads with a certain time constant and has a width. Multiple adjacent response waves may overlap to change the wave height of the response wave. Here, the erroneous energy of radiation is measured, and in the spectrum of the radiation, a peak with erroneous energy, the so-called sum peak occurs. A technique has conventionally been used of reducing occurrence of sum peaks by not counting radiation when multiple response waves overlap. Japanese Patent No. 6550376 discloses an example of such a technique.

SUMMARY

Various methods have conventionally been developed to detect the overlap of multiple response waves. In the case where multiple response waves completely overlap, however, the overlap of multiple response waves cannot be detected. Hence, the conventional technique cannot adequately remove the sum peaks from the spectrum of radiation.

The present disclosure is made in light of such circumstances, and the object is to provide a signal-processing method, a signal-processing device, a radiation detection apparatus and a computer program that are able to adequately remove sum peaks from the spectrum of radiation.

A signal processing method according to an aspect of the present disclosure for processing a signal including a response wave generated in response to detection of radiation, comprises: measuring a feature corresponding to a duration of a response wave or a response wave group composed of a plurality of response waves; counting, for each wave height, the number of response waves or response wave groups whose measured features are included in a predetermined first range in which a feature of a single response wave is included; and performing correction processing of subtracting a specific value from a counted number according to a response wave or a response wave group whose feature is not included in the first range.

In one aspect of the present disclosure, a feature corresponding to a duration of a response wave or a response wave group is measured, the response signal or response signal group whose feature is included in a first range in which a feature of a single response signal is included is counted for each wave height, and a response signal or a response signal group whose measured feature is not included in the first range is not counted. Furthermore, according to the response signal or the response signal group whose measured feature is not included in the first range, a specific value is subtracted from the counted value. Merely not counting the response wave group whose feature is not included in the first range results in a situation where the response wave group whose feature is included in the first range is erroneously counted as a single response wave. By subtracting a specific value from the counted number, the number estimated to be erroneously counted is removed.

In the signal processing method according to an aspect of the present disclosure, the specific value is the number of response wave groups whose features are included in the first range that are present at a predetermined ratio with respect to response wave groups whose features are not included in the first range.

In one aspect of the present disclosure, in the correction processing, the number of response wave groups whose feature is included in the first range is subtracted from the counted number of response waves or response wave groups whose feature is included in the first range. The response wave groups whose features are included in the first range are present at a certain ratio with respect to the response wave groups whose features are not included in the first range. Thus, by subtracting a value according to the number of response wave groups whose features are not included in the first range and the predetermined ratio, the estimated number of response wave groups whose features are included in the first range can be subtracted. This makes it possible to reduce the influence of the response wave groups with features substantially the same as the features of the single response waves as much as possible and make the number of counts of the response wave responding to the detection of radiation close to a true value.

The signal processing method according to an aspect of the present disclosure further comprises: determining whether or not the measured feature is included in the first range; counting a response wave or a response wave group for each wave height in a case where the measured feature is included in the first range; and performing the correction processing without counting a response wave or a response wave group if the measured feature is not included in the first range.

In one aspect of the present disclosure, every time it is determined that the feature is not included in the first range, the number of response waves or response wave groups whose features are included in the first range is corrected. This makes it possible to quickly perform correction and make the number of counts of the response wave responding to the detection of radiation close to a true value.

The signal processing method according to an aspect of the present disclosure further comprises: generating a first count number by counting, for each wave height, a response wave or a response wave group whose feature is included in the first range and not counting a response wave or a response wave group whose feature is not included in the first range; generating a second count number by counting, for each wave height, a response wave or a response wave group whose feature is included in a second range corresponding to a predetermined time range that starts after a time range corresponding to the first range; and correcting the first count number by adding to the first count number a value obtained by multiplying the second count number by a predetermined correction factor in the correction processing, and the correction factor is defined based on a ratio between a probability that a feature of a response wave group is included in the second range and a probability that a feature of a response wave group is included in the first range.

In one aspect of the present disclosure, a first count number is generated that is obtained by counting a response signal or a response signal group whose feature is included in the first range, and a second count number is generated that is obtained by counting a response signal group whose feature is included in a second range corresponding to a predetermined time range that starts after a time range corresponding to the first range. The first count number is corrected by adding the number obtained by multiplying the second count by the correction factor to the first count. The correction factor is determined so that the estimated number of response wave groups whose features are included in the first range is subtracted from the first count number by the correction processing based on the ratio between a probability of the feature of a response signal group is included in the second range and a probability of the feature of a response signal group is included in the first range. By using this correction factor, the correction processing is performed.

In the signal processing method according to an aspect of the present disclosure, a plurality of the second ranges and the correction factor corresponding to each of the plurality of the second ranges are defined; and the correction factor corresponding to one of the second ranges including the measured feature is used in the correction processing.

In one aspect of the present disclosure, a plurality of second ranges and correction factors corresponding to the second ranges are defined. If the number of response waves included in a response wave group is different, the distribution of the features varies, and the second ranges in which the features are included vary. The probability that the feature of the response wave group is included in the first range also vary. By using the correction factor corresponding to a different second range, the first count number is corrected depending on the number of response wave groups different in the second range where the feature is included.

The signal processing method according to an aspect of the present disclosure further comprises: generating a first spectrum indicating a relationship between the first count number and a wave height; and generating a second spectrum indicating a relationship between a wave height and a value obtained by correcting the first count number.

In one aspect of the present disclosure, a first spectrum based on the first count number and a second spectrum based on the number obtained by correcting the first count number are generated. The number obtained by correcting the first count number is a number obtained by subtracting, from the number of response wave or response wave groups whose features are included in the first range, a statistically estimated number of response wave groups whose feature is included in the first range. As a spectrum of radiation, a second spectrum for which occurrence of a sum peak caused by the response wave groups with features substantially the same as those of single response waves is reduced is generated. The first spectrum including a sum peak can be compared with the second spectrum.

The signal processing method according to an aspect of the present disclosure further comprises: calculating, for each wave height, a subtraction value obtained by subtracting a value obtained by correcting the first count number from the first count number; assigning a plurality of split values obtained by splitting the subtraction value for a certain wave height to a plurality of wave heights lower than that of the certain wave height, each of the split values being a value proportional to a value obtained by correcting the first count number at an assigned wave height; generating the plurality of split values for the subtraction value at each wave height; and further correcting the first count number by adding the split value to a value obtained by correcting the first count number at the assigned wave height.

In one aspect of the present disclosure, a subtraction value for each wave height corresponding to the number of response wave groups whose features are included in the first range is calculated, and multiple split values obtained by splitting the subtraction value are assigned equals the lower wave heights. The sum of the multiple split values is the subtraction value, and the split values are values that are proportional to the first count number corrected at the respective wave heights. Each split value is added to the corrected value of the first count number at the assigned wave height, which further corrects the first count number. Depending on the number of response wave groups whose features are included in the first range, the number of counts of the multiple response waves included in this response wave group increases. The intensity of the peaks in the spectrum of the radiation from which the sum peak is removed is recovered by the intensity of the sum peak caused by the response wave group whose feature is in the first range.

In the signal processing method according to an aspect of the present disclosure, the feature is a time width of a response wave or a response wave group.

In one aspect of the present disclosure, the feature is the time width of a response wave. The time width is used to thereby characterize a response wave or a response wave group.

In the signal processing method according to an aspect of the present disclosure, the feature is a time length from a start of a first response wave included in a response wave group to an end of a last response wave included in the response wave group.

In one aspect of the present disclosure, the feature is a time length from the start of the first response wave to the end of the last response wave that are included in the response wave group. The use of the time length as a feature can also characterize the response wave group and can perform correction processing of reducing the influence of the response wave groups with time widths substantially the same as the time widths of the single response waves.

In the signal processing method according to an aspect of the present disclosure, the response wave is a staircase wave or a pulse wave.

In one aspect of the present disclosure, by using the radiation detector that generates a staircase wave in response to detection of radiation, the influence of the staircase wave groups with features substantially the same as the features of the single staircase waves is reduced. Alternatively, by using the radiation detector that generates a pulse wave in response to detection of radiation, the influence of the pulse wave groups with features substantially the same as the features of the single pulse waves is reduced.

A signal processing device according to an aspect of the present disclosure, comprises: a feature measurement unit that measures a feature corresponding to a duration of a response wave or a response wave group composed of a plurality of response waves generated in response to detection of radiation; a determination unit that determines whether or not a measured feature is included in a predetermined first range in which a feature of a single response wave is included; and a correction unit that counts, for each wave height, the number of response waves or response wave groups whose features are included in the first range and that subtracts a specific value from a counted number according to a response wave or a response wave group whose feature is not included in the first range.

In one aspect of the present disclosure, the signal processing device measures the feature of a response wave or a response wave group, counts, for each wave height, the response wave or the response wave group if the feature is included in a first range and does not count the response wave or response wave group if the feature is not included in the first range. Furthermore, the signal processing device subtracts a specific value from the counted number according to the response wave or the response wave group whose feature is not included in the first range. Hence, the signal processing device can reduce the influence of the response wave groups with features substantially the same as the features of the single response waves as much as possible and make the number of counts of the response wave responding to detection of radiation close to a true value.

A radiation detection apparatus according to an aspect of the present disclosure, comprises: a radiation detector that generates a response wave in response to incidence of radiation; a feature measurement unit that, in a case where the radiation detector generates a response wave or a response wave group composed of a plurality of response waves, measures a feature corresponding to a duration of a generated response wave or response wave group; a determination unit that determines whether or not a measured feature is included in a predetermined first range in which a feature of a single response wave is included; and a correction unit that counts, for each wave height, the number of response waves or response wave groups whose features are included in the first range and subtracts a specific value from a counted number according to a response wave or a response wave group whose feature is not included in the first range.

In one aspect of the present disclosure, the radiation detection apparatus detects radiation to generate a response wave, measures the feature of a response wave or a response wave group, and counts the response wave or the response wave group for each wave height if the feature is included in the first range, and does not count the response wave or response wave group if the feature is not included in the first range. Furthermore, the radiation detection apparatus subtracts a specific value from the counted number according to the response wave or the response wave group whose feature is not included in the first range. Hence, the radiation detection apparatus can reduce the influence of the response wave groups with features substantially the same as the features of the single response waves as much as possible and make the number of counts of the response wave responding to detection of radiation close to a true value.

The radiation detection apparatus according to an aspect of the present disclosure, further comprises: a first spectrum generation unit that generates a first spectrum indicating a relationship between a wave height and a first count number obtained by counting, for each wave height, the number of response waves or response wave groups whose features are included in the first range; and a second spectrum generation unit that generates a second spectrum indicating a relationship between a wave height and a value obtained by correcting the first count number by the correction unit.

In one aspect of the present disclosure, the radiation detection apparatus generates a first spectrum based on the first count number and a second spectrum based on a number obtained by correcting the first count number. The number obtained by correcting the first count number is a number obtained by subtracting, from the number of response wave or response wave groups whose features are included in the first range, a statistically estimated number of response wave groups whose feature is included in the first range. This makes it possible to generate the second spectrum for which occurrence of sum peaks caused by the response wave groups with features substantially the same as those of single response waves are reduced.

A computer program according to an aspect of the present disclosure causes a computer to execute processing of: acquiring, in the case where a feature corresponding to a duration of a response wave or a response wave group composed of a plurality of response waves generated in response to detection of radiation is included in a predetermined first range in which a feature of a single response wave is included, a first count number generated by counting a response wave or a response wave group for each wave height; acquiring a second count number obtained by counting, for each wave height, a response wave or a response wave group whose feature is included in a second range corresponding to a predetermined time range that starts after a time range corresponding to the first range; and subtracting the number of response wave groups whose features are included in the first range from the first count number according to the second count number.

In one aspect of the present disclosure, the computer according to the computer program generates the first count number obtained by counting the number of response waves or response wave groups whose features are included in the first range and the second count number obtained by counting the number of response wave groups whose features are included in the second range, and corrects the first count number according to the second count number. Without the signal processing device making a count, the computer generates the first count number and the second count number as well to correct the first count number, which generates the spectrum in which sum peaks are reduced.

The present disclosure exerts a superior effect such as generating a spectrum of radiation from which sum peaks are adequately removed, and the like.

The above and further objects and features will more fully be apparent from the following detailed description with accompanying drawings.

DESCRIPTION

The present disclosure will be described in detail below with reference to the drawings showing embodiments thereof.

First Embodiment 1

Figure 1:
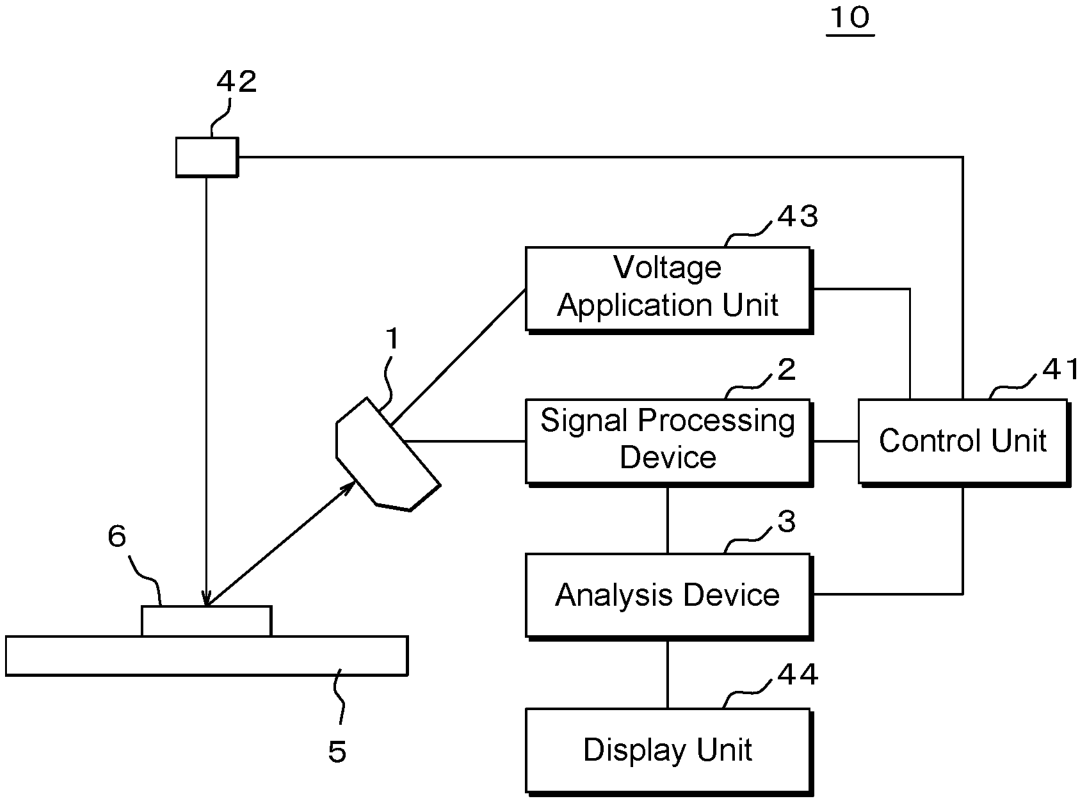
FIG. 1 is a block diagram illustrating an example of the functional configuration of a radiation detection apparatus.

FIG. 1 is a block diagram illustrating an example of the functional configuration of a radiation detection apparatus 10. The radiation detection apparatus 10 is a fluorescence X-ray spectrometer, for example. The radiation detection apparatus 10 is equipped with an irradiation unit 42 that irradiates a sample 6 with radiation such as electron beam, X-ray or the like, a sample stand 5 on which the sample 6 is placed and a radiation detector 1. Radiation is emitted from the irradiation unit 42 to the sample 6 where radiation such as fluorescence X-ray or the like is generated. The radiation detector 1 detects the radiation generated from the sample 6. The radiation is indicated by arrows in the drawing. Note that the radiation detection apparatus 10 may hold the sample 6 by taking a method other than the method of placing the sample 6 on the sample stand 5.

The radiation detector 1 is connected to a signal processing device 2 and a voltage application unit 43 that applies voltage necessary for detecting radiation to a radiation detection element contained in the radiation detector 1. The signal processing device 2 is connected to an analysis device 3. The signal processing device 2, the analysis device 3, the voltage application unit 43 and the irradiation unit 42 are connected to a control unit 41. The control unit 41 controls the operations of the signal processing device 2, the analysis device 3, the voltage application unit 43 and the irradiation unit 42. The analysis device 3 is connected to a display unit 44 such as a liquid crystal display, an EL display (Electroluminescent Display) or the like. The control unit 41 may be configured to accept an operation by the user and to control the components of the radiation detection apparatus 10 according to the received operation.

Figure 2:
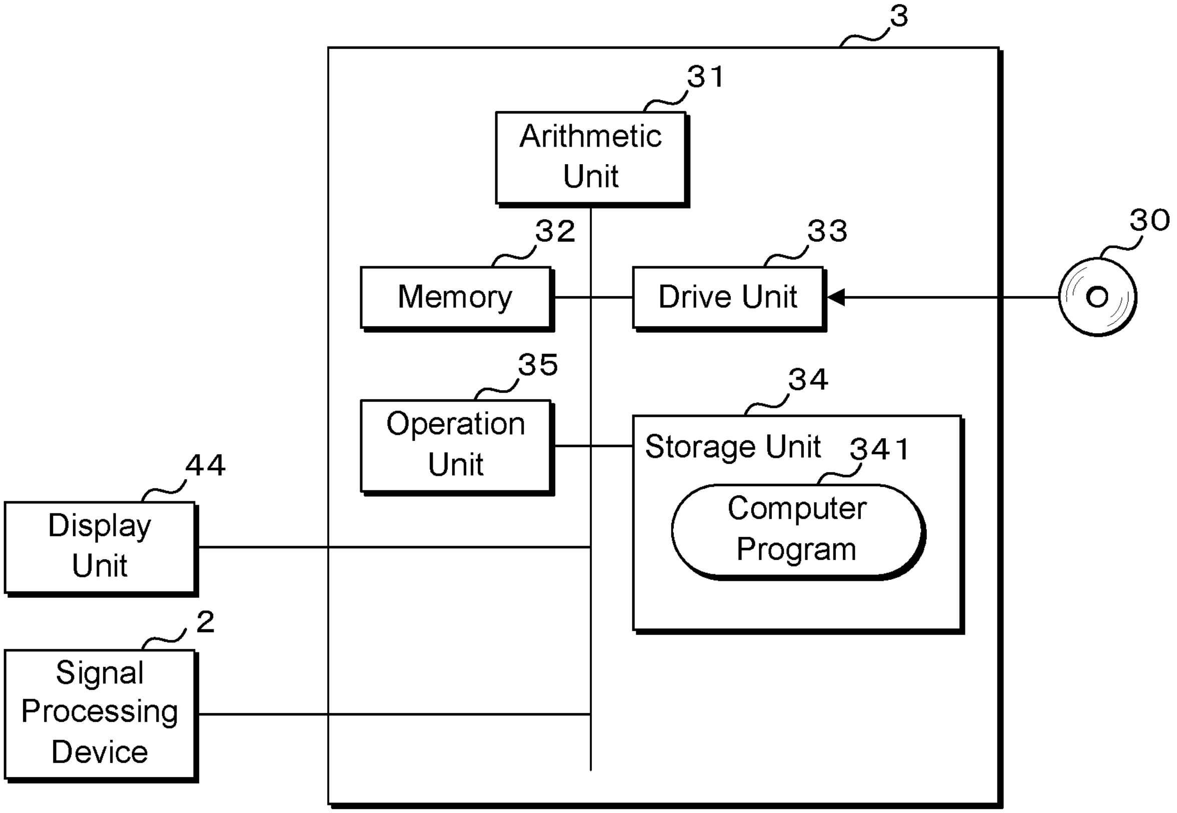
FIG. 2 is a block diagram illustrating an example of the internal configuration of an analysis device.

FIG. 2 is a block diagram illustrating an example of the internal configuration of the analysis device 3. The analysis device 3 is a computer such as a personal computer or the like. The analysis device 3 is equipped with an arithmetic unit 31, a memory 32, a drive unit 33, a storage unit 34 and an operation unit 35. Furthermore, the analysis device 3 is connected to the display unit 44 and the signal processing device 2. The arithmetic unit 31 is configured with a CPU (Central Processing Unit), a GPU (Graphics Processing Unit) or a multi-core CPU, for example. The arithmetic unit 31 may also be configured with a quantum computer. The memory 32 stores temporary data generated with arithmetic operation. The memory 32 is a RAM (Random Access Memory), for example. The drive unit 33 reads information from a recording medium 30 such as an optical disk, a portable memory or the like.

The storage unit 34 is non-volatile and is a hard disk or a non-volatile semiconductor memory, for example. The operation unit 35 accepts input of information such as text or the like by accepting an operation performed by the user. The operation unit 35 is a touch panel, a keyboard or a pointing device, for example.

The arithmetic unit 31 causes the drive unit 33 to read a computer program 341 recorded in the recording medium 30 and causes the storage unit 34 to store the read computer program 341. The arithmetic unit 31 performs processing necessary for the analysis device 3 according to the computer program 341. Note that the computer program 341 may be downloaded from outside the analysis device 3. Alternatively, the computer program 341 may be stored in the storage unit 34 in advance. In these cases, the analysis device 3 is not necessarily provided with the drive unit 33. Here, the analysis device 3 may be configured with multiple computers. Alternatively, the control unit 41 and the analysis device 3 may be configured in the same computer.

Figure 3:
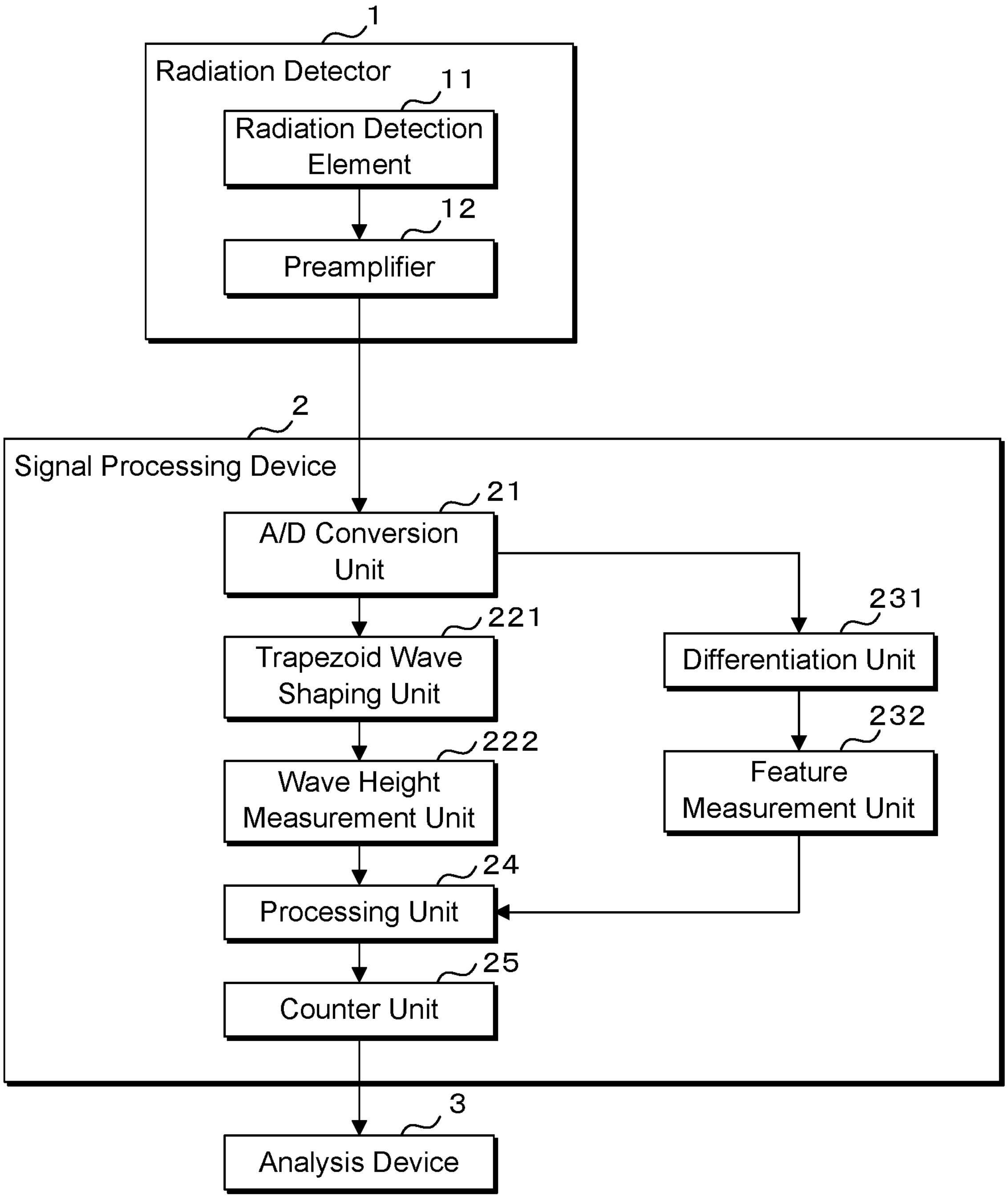
FIG. 3 is a block diagram illustrating a functional configuration of a radiation detector and a signal processing device according to a first embodiment.

FIG. 3 is a block diagram illustrating a functional configuration of the radiation detector 1 and the signal processing device 2 according to the first embodiment. FIG. 3 indicates the signal flow with arrows. The radiation detector 1 is equipped with a radiation detection element 11 and a preamplifier 12. The radiation detection element 11 generates a charge corresponding to the energy of the incident radiation and outputs a current signal corresponding to the generated charge. For example, the radiation detection element 11 is a semiconductor radiation detection element such as a silicon drift radiation detection element. The preamplifier 12 converts the current signal output by the radiation detection element 11 into a voltage signal to generate a staircase wave. The staircase wave corresponds to a response wave. The radiation detector 1 outputs a signal including the staircase wave generated by the preamplifier 12. The radiation detector 1 thus generates a staircase wave.

Figure 4:
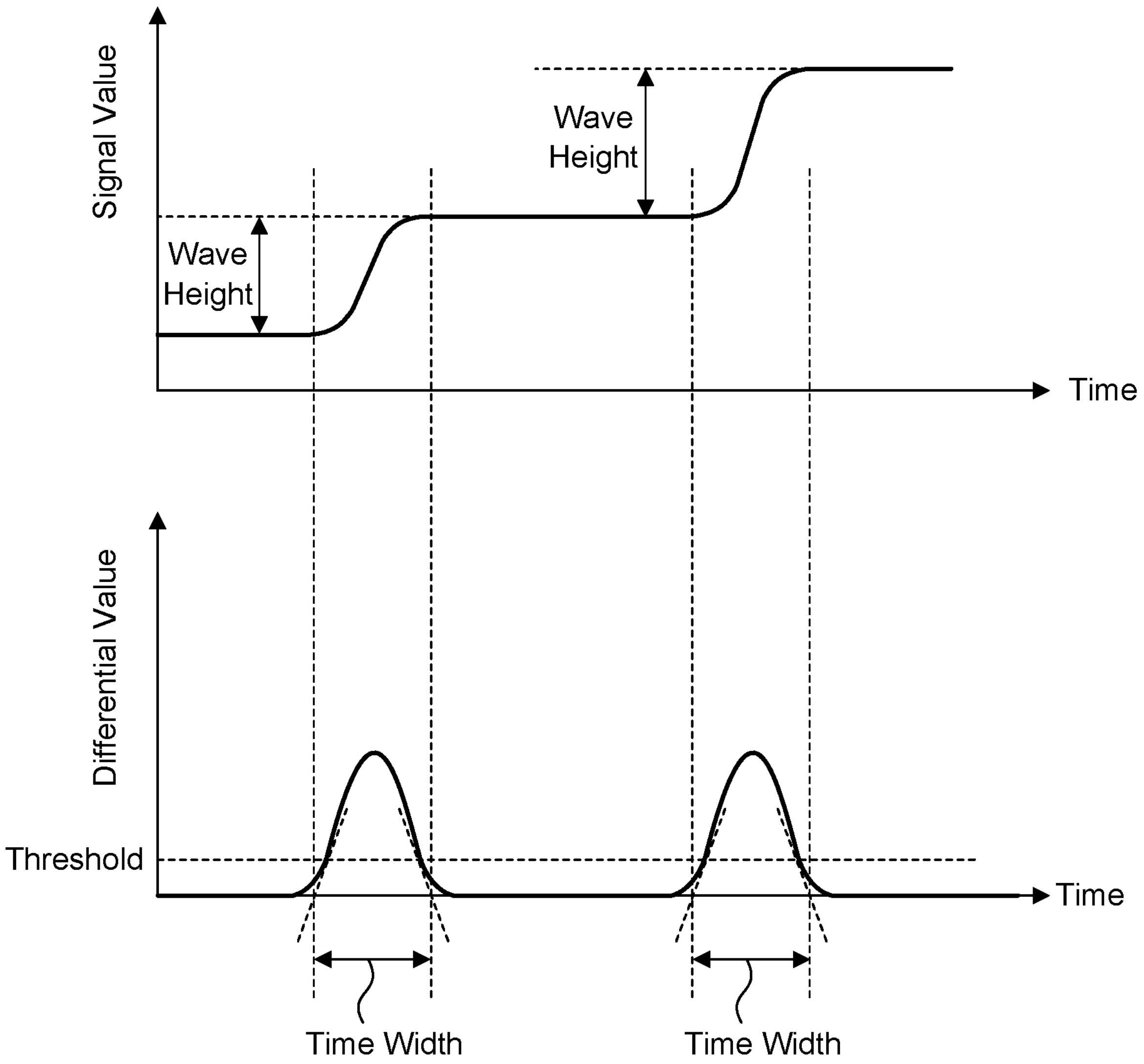
FIG. 4 is a schematic characteristic diagram representing an example of staircase waves and their differentiated waveforms.

FIG. 4 is a schematic characteristic diagram representing an example of staircase waves and their differentiated waveforms. A signal consisting of staircase waves is represented at the upper section while a differential signal is represented at the lower section. In the drawing, the horizontal axis represents time, the vertical axis at the upper section represents a signal value, and the vertical axis at the lower section represents a differential value. Every time a single event occurs in which radiation is incident to the radiation detection element 11 and the radiation detection element 11 detects the radiation, the radiation detector 1 outputs a staircase wave where the signal value rises in a single step. In response to a single event, one single staircase wave where the signal value rises in a single step is generated. If multiple events occur, a signal containing multiple staircase waves is output. Every time an event occurs, the signal value rises. The height of the step at which the signal value rises is a wave height of the staircase wave. The wave height of the staircase wave corresponds to the energy of the detected radiation. The radiation detection apparatus 10 determines the energy of the radiation depending on the wave height of a staircase wave.

A differential signal for the staircase wave is a signal that rises from a predetermined signal reference to a peak value and then falls to the signal reference. The signal reference is zero, for example. The integral of the differential signal corresponds to the wave height of the staircase wave. The staircase wave has a time width corresponding to the time during which the staircase wave lasts. A certain time point in the elapsed time is referred to as a point. As illustrated in FIG. 4, tangent lines with respect to a differentiated waveform at two points at which the differential values of the staircase wave take a predetermined threshold are generated, and the distance (the length of time) between two points where the two tangent lines cross the horizontal axis (straight line indicating the signal reference) is defined as a time width of the staircase wave. The time width of a staircase wave corresponds to the time during which the staircase wave lasts. The time width varies for different staircase waves and characterizes the staircase waves. Note that the signal processing device 2 may use the distance between the two points at which the differential values of the staircase wave take a predetermined threshold as a time width of the staircase wave. The signal processing device 2 may use the time width of the staircase wave obtained according to another method.

Figure 5:
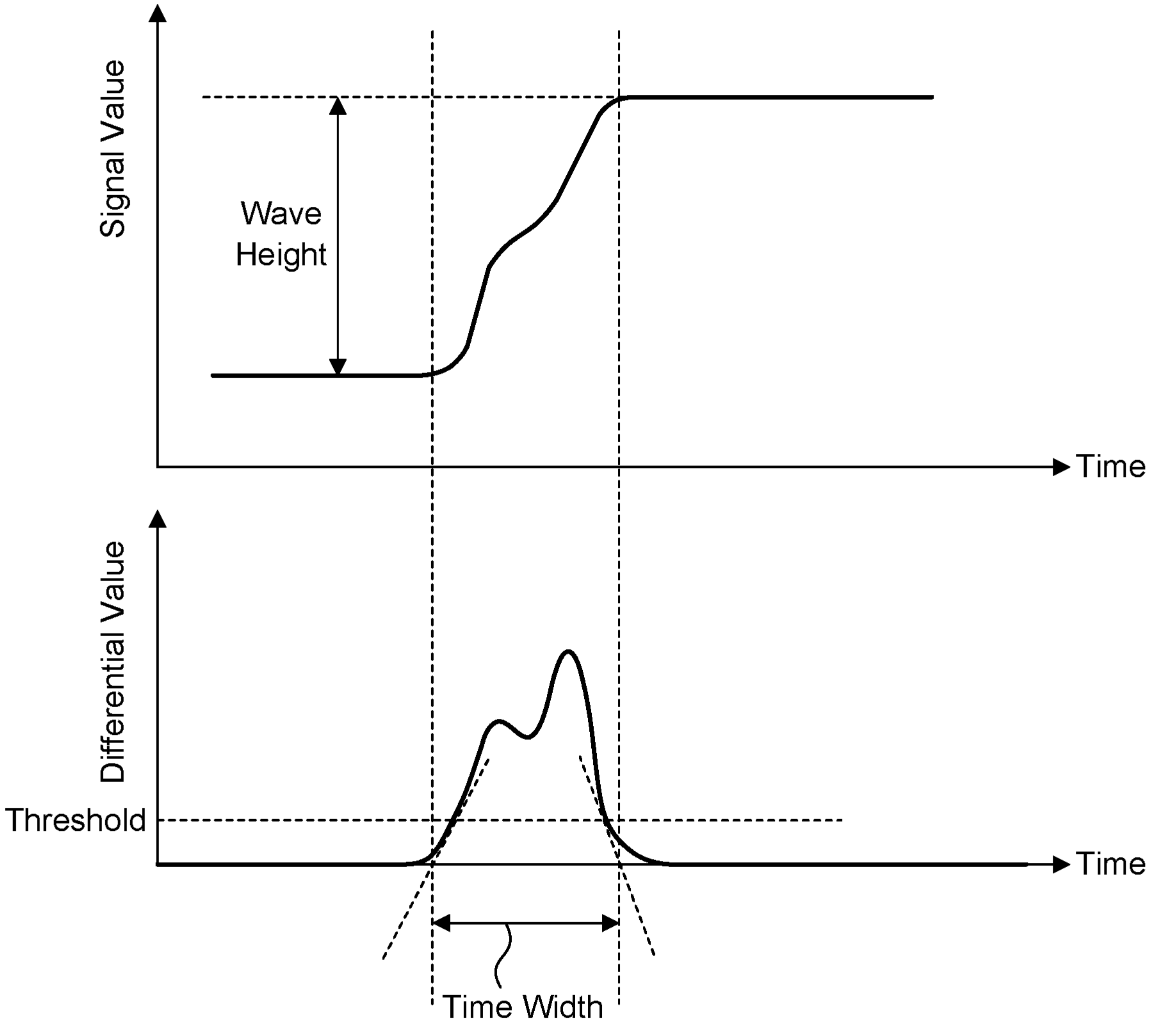
FIG. 5 is a schematic characteristic diagram representing an example of staircase waves and their differentiated waveforms in the case where the interval between events is short.

FIG. 5 is a schematic characteristic diagram representing an example of staircase waves and their differentiated waveforms in the case where the interval between events is short. A signal consisting of staircase waves is represented at the upper section while a differential signal is represented at the lower section. In the drawing, the horizontal axis represents time, the vertical axis at the upper section represents a signal value, and the vertical axis at the lower section represents a differential value. In the example illustrated in FIG. 5, the interval between events is shorter than that in the example illustrated in FIG. 4. A staircase wave group consisting of multiple staircase waves occurs, the multiple staircase waves having a short interval and overlapping with each other. The staircase wave group corresponds to a response wave group. A single staircase wave group consists of multiple staircase waves included within an area starting from one point at which the differential value takes a predetermined threshold to the next point where the differential value takes the predetermined threshold. If the interval between two events is equal to or less than the time width of a single staircase wave, that is, if the interval between adjacent staircase waves is equal to or less than the time width of a single staircase wave, a staircase wave group occurs.

As illustrated in FIG. 5, a staircase wave group is collectively assumed as a single staircase or step, and the height of the staircase or step at which the signal value rises by the staircase wave group is assumed as a wave height of the staircase wave group. The wave height of the staircase wave group does not correspond to the energy of the detected radiation. As illustrated in FIG. 5, tangent lines with respect to a differentiated waveform at two points at which the differential values of the staircase wave group take a predetermined threshold are generated, and the distance (the length of time) between two points where the two tangent lines cross the horizontal axis is defined as the time width of the staircase wave group. The time width of the staircase wave group, which corresponds to the time during which the staircase wave group lasts, is the time length from when the first staircase wave starts to when the last staircase wave ends, both of the staircase waves being included in the staircase wave group.

The time width of a staircase wave group tends to be longer than that of a single staircase wave. However, in the case where the interval between two events is extremely short, the two staircase waves are very close, and the time width of a staircase wave group consisting of the two staircase waves is substantially the same as that of a single staircase wave. The staircase wave group having a time width substantially the same as that of a single staircase wave cannot be discriminated from the single staircase wave based on the time width. As such, signals presumed to consist of a single staircase wave may include some signals consisting of staircase wave groups including multiple staircase waves. In the case where the wave height of a staircase wave group is erroneously measured as the wave height of a single staircase wave, the energy of the radiation may erroneously be measured according to the wave height.

A signal output by the radiation detector 1 is input to the signal processing device 2. The signal processing device 2 performs a signal processing method. As illustrated in FIG. 3, the signal processing device 2 is equipped with an A/D (analog/digital) conversion unit 21. The A/D conversion unit 21 receives an input of a signal including a staircase wave from the radiation detector 1 and performs A/D conversion on the signal including the staircase wave. The A/D conversion unit 21 receives successive signal inputs, samples the signals and performs A/D conversion of the value obtained by sampling to generate discrete signal values. The signal output by the A/D conversion unit 21 consists of multiple discrete signal values. The time interval between the signal values is constant.

The A/D conversion unit 21 is connected to a trapezoid wave shaping unit 221 and a differentiation unit 231. The trapezoid wave shaping unit 221 and the differentiation unit 231 receive signals from the A/D conversion unit 21. Between the A/D conversion unit 21 and the trapezoid wave shaping unit 221 and between the A/D conversion unit 21 and the differentiation unit 231, a conversion unit that converts the signal so that the distortion of the waveform caused by the signal delay is canceled out and a noise removal unit that removes the noise of the signal may be connected.

Figure 6:
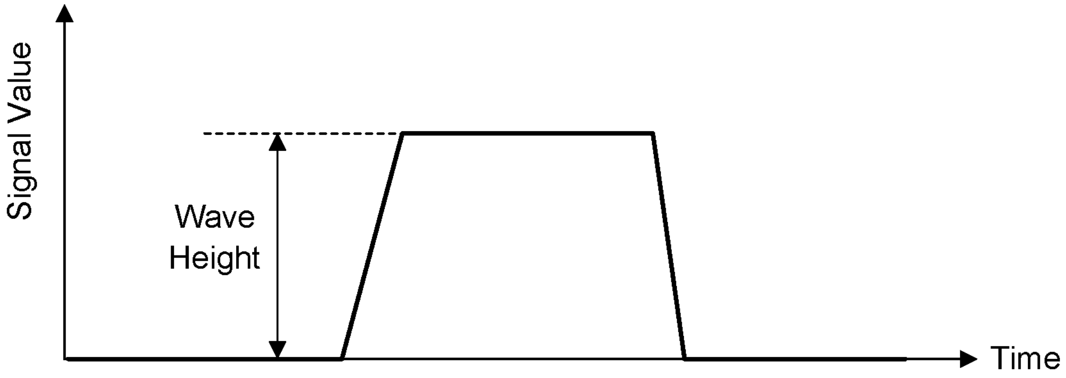
FIG. 6 is a schematic characteristic diagram representing an example of a trapezoid wave.

The trapezoid wave shaping unit 221 is configured with a trapezoid wave shaping filter. The trapezoid wave shaping unit 221 shapes the waveform of the input signal with the trapezoid wave shaping filter to convert a staircase wave or a staircase wave group included in the signal to a trapezoid wave. FIG. 6 is a schematic characteristic diagram representing an example of the trapezoid wave. In the drawing, the horizontal axis represents time, and the vertical axis represents a converted signal value. The trapezoid wave illustrated in FIG. 6 is a trapezoid wave converted from a staircase wave. The shape of the trapezoid wave has a trapezoid shape with a certain height. The shape of the trapezoid wave converted from a staircase wave group may vary in height. The height from a predetermined signal reference to the maximum value of the trapezoid wave is assumed as a wave height of the trapezoid wave. The wave height of the trapezoid wave converted from a staircase wave or a staircase wave group corresponds to the wave height of the staircase wave or the staircase wave group. The trapezoid wave shaping unit 221 is connected to a wave height measurement unit 222.

The differentiation unit 231 performs an arithmetic operation that approximates the differentiation by calculating the difference. For example, the differentiation unit 231 is configured with a processor. The differentiation unit 231 calculates the difference between two adjacent signal values included in the input signal. Thus, the differentiation unit 231 approximately differentiates the staircase wave or the staircase wave group included in the signal. The signal processing device 2 regards the difference value calculated by the differentiation unit 231 as an approximate differential value, regards a signal consisting of multiple difference values as an approximate differential signal, and regards a waveform of the signal consisting of the multiple difference values as an approximate differentiated waveform. Note that the differentiation unit 231 may calculate a differential value by a method other than the method of regarding the difference value as an approximate differential value, such as a method of dividing the difference value by the interval between the signals.

The differentiation unit 231 is connected to a feature measurement unit 232. For example, the feature measurement unit 232 is configured with a processor that performs arithmetic operations. The feature measurement unit 232 measures a feature corresponding to the time during which a staircase wave or a staircase wave group lasts. In the present embodiment, the feature measurement unit 232 measures the time width of a staircase wave or a staircase wave group as a feature. The feature measurement unit 232 receives an input of a signal from the differentiation unit 231 and measures, from the differentiated waveform of the staircase wave or the staircase wave group included in the signal, the time width of the staircase wave or the staircase wave group. As described with reference to FIGS. 4 and 5, the feature measurement unit 232 generates tangent lines with respect to a differentiated waveform at two points at which the differential values take a predetermined threshold and calculates the distance between two points where the two tangent lines cross the horizontal axis to thereby measure the time width of the staircase wave or the staircase wave group.

The wave height measurement unit 222 and the feature measurement unit 232 are connected to the processing unit 24. The processing unit 24 is configured with a processing element that performs arithmetic operations. For example, the processing unit 24 is configured with an FPGA (field-programmable gate array). The processing unit 24 receives an input of a wave height from the wave height measurement unit 222 and receives an input of a time width of a staircase wave or a staircase wave group from the feature measurement unit 232. The processing unit 24 determines whether or not the time width measured by the feature measurement unit 232 is included in a predetermined first range in which the time width of a single staircase wave is included.

Figure 7:
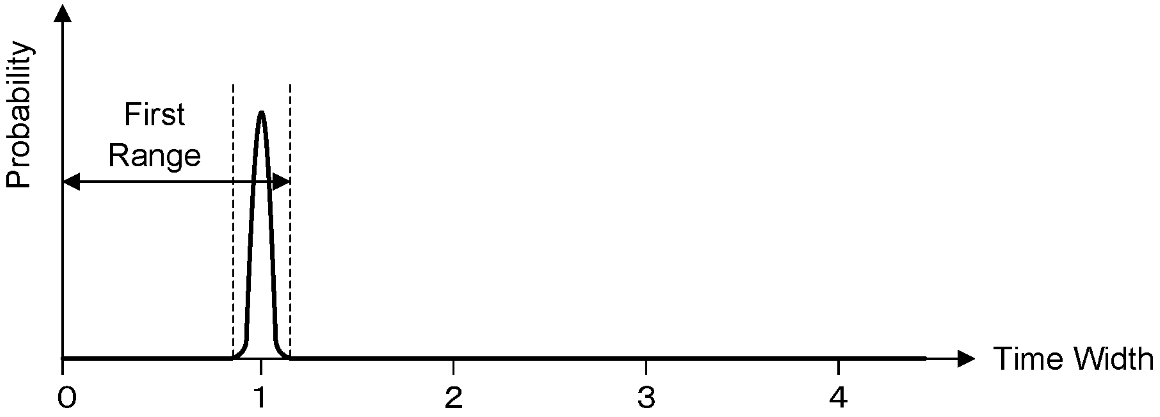
FIG. 7 is a schematic characteristic diagram representing a probability distribution of the time widths of single staircase waves.

FIG. 7 is a schematic characteristic diagram representing a probability distribution of the time widths of single staircase waves. In the drawing, the horizontal axis represents a time width, and the numerical values denoted at the horizontal axis are numerical values when the mean value of time widths of the single staircase waves is assumed as 1. The vertical axis represents the probability. FIG. 7 schematically illustrates an ideal probability distribution. The time widths of the single staircase waves are distributed around the mean value. An upper limit that is taken by the possible values of the time widths of single staircase waves is set, and the range of the time width from zero to the upper limit is assumed as a first range. The first range is set such that possible values of the time widths of the single staircase waves are included. The processing unit 24, if a measured time width is equal to or less than the predetermined upper limit, determines that the time width is included in the first range. The processing unit 24 may determine that the time width is included in the first range if the time width is less than the upper limit. If a measured time width is not included in the first range, the measured time width is the time width of the staircase wave group, not the time width of the single staircase wave. Erroneous counting of a staircase wave group as a single staircase wave causes sum peaks. A lower limit that is taken by the possible values of the time widths of the single staircase wave may be set, and the range from the lower limit to the upper limit may be assumed as a first range. The processing unit 24 stores the information for identifying the first range in advance.

The processing unit 24 is connected to a counter unit 25. The counter unit 25 counts the number of staircase waves for each wave height. For example, the counter unit 25 is a multi-channel analyzer. In the multi-channel analyzer, multiple channels are associated with respective wave heights. The counter unit 25 may be configured to count a pulse wave for all the wave heights or to count a pulse wave only for a specific wave height.

In the case where a time width measured by the feature measurement unit 232 is included in the first range, the processing unit 24 inputs instructions to the counter unit 25 to increase the count by one for the wave height measured by the wave height measurement unit 222. The counter unit 25 makes a count according to the input instructions. In the case where the time width measured by the feature measurement unit 232 is not included in the first range, the processing unit 24 does not input instructions to the counter unit 25 to make a count. Thus, the counter unit 25 does not count a staircase wave group whose time width is not included in the first range. This can prevent erroneous counting of a staircase wave group with a time width greater than the time width of a single staircase wave as a single staircase wave. As described above, however, there are some staircase wave groups with time widths substantially the same as the time width of the single staircase wave. The number of counts counted when the time width is included in the first range includes the number of staircase waves whose time width is included in the first range and the number of staircase wave groups whose time width is included in the first range.

Figure 8:
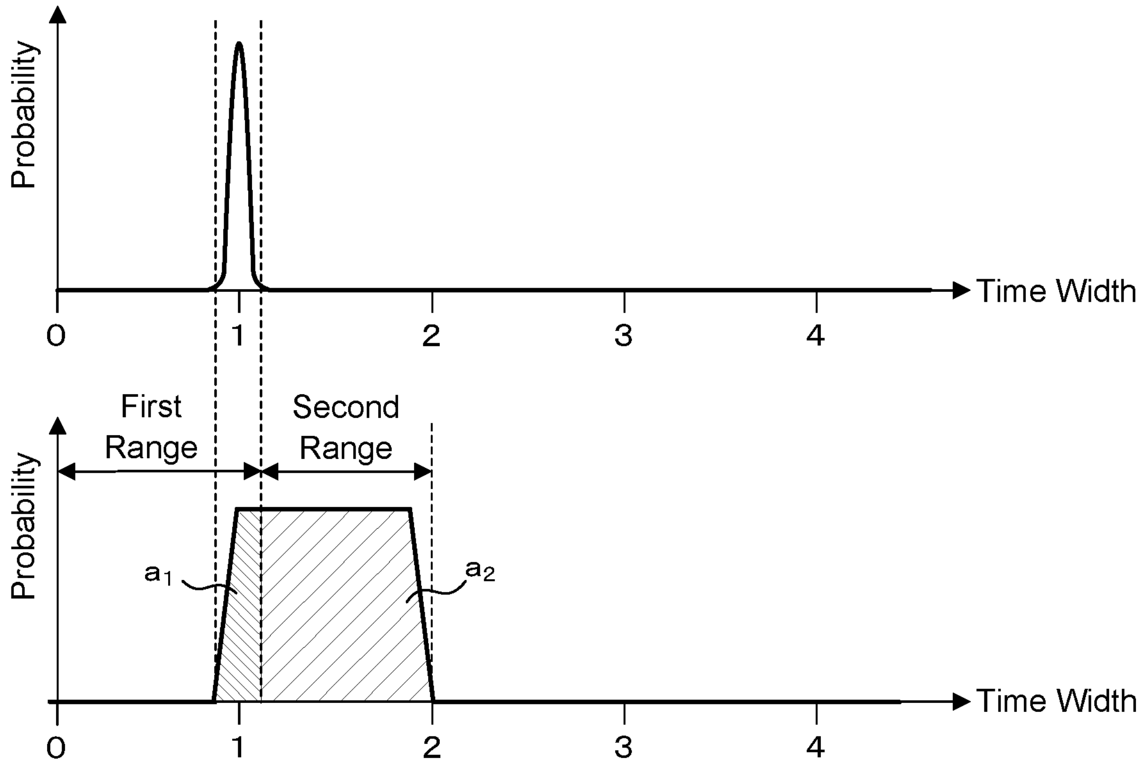
FIG. 8 is a schematic characteristic diagram representing a probability distribution of the time widths of the single staircase waves and a probability distribution of the time widths of double staircase wave groups.

The processing unit 24 further performs processing of reducing the influence of the staircase wave groups with time widths substantially the same as the time width of the single staircase wave. As an example of the staircase wave group, only the staircase wave group where two staircase waves overlap is considered. The staircase wave group where two staircase waves overlap is referred to as a double staircase wave group below. FIG. 8 is a schematic characteristic diagram representing a probability distribution of the time widths of the single staircase waves and a probability distribution of the time widths of the double staircase wave groups. The probability distribution of the time widths of the single staircase waves is represented at the upper section, and the probability distribution of the time widths of the double staircase wave groups is represented at the lower section. In the drawing, the horizontal axis represents a time width, and the numerical values denoted at the horizontal axis are numerical values when the mean value of time widths of the single staircase waves is assumed as 1. The vertical axis represents the probability. FIG. 8 schematically represents an ideal probability distribution.

As in the description above, the time widths of the single staircase waves are distributed around the mean value. The time widths of the double staircase wave groups are distributed from the lower limit the same as the time width of the single staircase wave to nearly double the mean value of the time widths of the single staircase waves. If time width of the double staircase wave group exceeds the value close to double the mean value of the time widths of the single staircase waves, it is separated to the two staircase waves. Thus, the upper limit of the time width of the double staircase wave group is a value close to double the mean value of the time widths of the single staircase waves. Radiation incident to the radiation detection element 11 can be assumed as random, and thus the probability that the next radiation is incident after one radiation is constant independent of the intervals between incident radiation. Thus, the probability distribution of the time widths of the double staircase wave groups is almost uniformly distributed.

As illustrated in FIG. 8, the double staircase wave groups may include a staircase wave group with time widths substantially the same as the time width of the single staircase wave. That is, a staircase wave group whose time width is included in the first range is present. Hence, merely not counting the staircase wave group whose time width is not included in the first rage results in the situation where the staircase wave groups whose time widths are included in the first range are erroneously counted as a single staircase wave. Erroneous counting of the staircase wave group whose time width is included in the first range as a single staircase wave causes sum peaks.

An upper limit that can be taken by the time width of the double staircase wave group is set. A second range is set that corresponds to a predetermined time range from a point after the lapse of the time range corresponding to the first range to the set upper limit. The second range is so set that possible values of the time widths of the double staircase wave groups that are not included in the first range are included. There may be a gap between the first range and the second range. The upper limit that can be taken by the time width of the double staircase wave group may be limitless.

In the case where staircase wave groups whose time widths are included in the second range occur, the staircase wave groups whose time widths are included in the first range should also occur with a certain probability. If the number of staircase wave groups whose time widths are included in the second range is obtained, the number of staircase wave groups whose time widths are included in the first range can statistically be estimated based on the ratio between the probability of occurrence of staircase wave groups whose time widths are included in the first range and the probability of occurrence of staircase wave groups whose time widths are included in the second range. The integrals in the first range and in the second range of the probability distribution of the time widths of the double staircase wave groups are assumed to be $a_1$ and $a_2$, respectively. The ratio between the probability of occurrence of staircase wave groups whose time width are included in the first range and the probability of occurrence of staircase wave groups whose time widths are included in the second range is $(a_1/a_2)$. For each staircase wave group whose time width is included in the second range, the number of staircase wave groups whose time width is included in the first range is estimated as $(a_1/a_2)$.

The processing unit 24 stores in advance the information to identify the second range and the count value for correction $k_2=(-a_1/a_2)$. The value of $k_2$ is preset by setting the first range and second range and performing calculation based on the probability distribution of the time width of the double staircase wave group. To determine $k_2$, a theoretical probability distribution may be used, or a probability distribution obtained experimentally with standard samples may be used.

In the case where a time width measured by the feature measurement unit 232 is not included in the first range, the processing unit 24 inputs instructions to the counter unit 25 to increase the count by $k_2$ for the wave height measured by the wave height measurement unit 222. The processing unit 24 may determine whether or not the time width is included in the second range, and may perform processing of instructing the counter unit 25 to increase the count by $k_2$ if the time width is included in the second range. The counter unit 25 makes a count according to the input instruction. Since the value of $k_2$ is a negative value, the number of counts by the counter unit 25 decreases. The number of staircase wave groups whose time widths are included in the first range estimated to be detected in the case where one staircase wave group whose time width is included in the second range is detected is $(-a_1/a_2)$. Thus, by increasing the count by $k_2=(-a_1/a_2)$, the estimated value of the number of staircase wave groups whose time widths are included in the first range is subtracted from the number of staircase waves or staircase wave groups whose time widths are included in the first range. This reduces the influence of the staircase wave groups with time widths substantially the same as the time width of the single staircase wave, in the number of counts of the single staircase waves.

The signal processing device 2 outputs data indicating the relationship between the wave height of the staircase wave and the number of counts counted by the counter unit 25. The number of counts corresponds to the number of times the radiation detector 1 detects radiation with energy corresponding to the wave height of the staircase wave.

The analysis device 3 receives an input of data output by the signal processing device 2. The analysis device 3 performs processing of generating a spectrum of the radiation detected by the radiation detector 1 based on the relationship between the wave height of the staircase wave and the number of counts. The arithmetic unit 31 executes necessary processing according to the computer program 341. The analysis device 3 may perform further processing such as elementary analysis or the like of a radiation source based on the generated spectrum of the radiation. For example, the radiation detector 1 detects fluorescence X-ray, and the analysis device 3 performs qualitative analysis or quantitative analysis on the elements in the sample based on the spectrum of the fluorescence X-ray. The display unit 44 displays the spectrum generated by the analysis device 3 and the analysis results of the analysis device 3. Note that the signal processing device 2 may also have a function of generating radiation spectrum.

Figure 9:
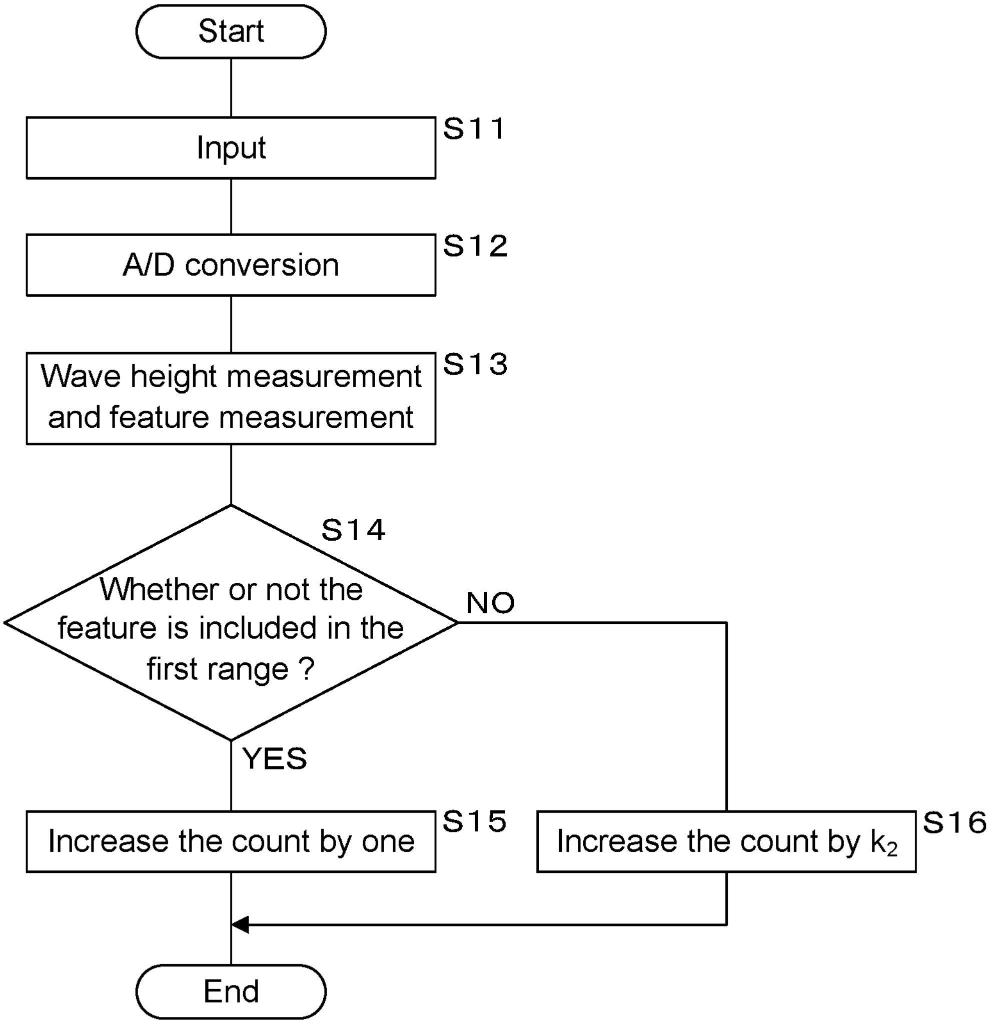
FIG. 9 is a flowchart of a processing procedure to be executed by the signal processing device according to the first embodiment.

The flow of the processing to be executed by the signal processing device 2 is described. FIG. 9 is a flowchart of a processing procedure to be executed by the signal processing device 2 according to the first embodiment. A step will be abbreviated as S below. When radiation is incident to the radiation detection element 11, the radiation detector 1 generates a staircase wave corresponding to the energy of the radiation and outputs a signal including a staircase wave. The signal processing device 2 receives an input of the signal including a staircase wave from the radiation detector 1 (S11). The A/D conversion unit 21 performs A/D conversion on the input signal (S12).

The A/D converted signal is subjected to wave height measurement and feature measurement (S13). At S13, the trapezoid wave shaping unit 221 converts the waveform of the A/D converted signal to a trapezoid wave, and the wave height measurement unit 222 measures the wave height of the trapezoid wave to thereby measure the wave height of the staircase wave or the staircase wave group included in the signal. In addition, the differentiation unit 231 differentiates the A/D converted signal, and the feature measurement unit 232 measures the time width (feature) of the staircase wave or the staircase wave group included in the signal.

The processing unit 24 determines whether or not the time width (feature) measured by the feature measurement unit 232 is included in the first range (S14). If the time width (feature) is included in the first range (S14: YES), the processing unit 24 inputs instructions to the counter unit 25 to increase the count by one, and the counter unit 25 increases the count by one for the wave height measured by the wave height measurement unit 222 (S15). The counter unit 25, which is a multi-channel analyzer, records the number of counts in each channel, and adds one to the number of counts recorded in the channel associated with the wave height at S15. The processing of S14 and S15 allows counting of the number of staircase waves or staircase wave groups whose time widths are included in the first range. The number of counts includes the number of single staircase waves and the number of staircase wave groups whose time widths are included the first range.

If the time width (feature) is not included in the first range (S14: NO), the processing unit 24 inputs instructions to the counter unit 25 to increase the count by $k_2$, and the counter unit 25 increases the count by $k_2$, not by one, for the wave height measured by the wave height measurement unit 222 (S16). In other words, the counter unit 25 corrects the count number by adding $k_2$ to the count number recorded in the channel associated with the wave height. Note that the processing unit 24 may determine whether or not the time width (feature) is included in the second range if the time width is not included in the first range and may input instructions to the counter unit 25 increase the count by $k_2$ if the time width is included in the second range to cause the counter unit 25 to increase the count by $k_2$. The processing unit 24 corresponds to a determination unit and a correction unit.

After completion of S15 or S16, the signal processing device 2 ends the processing. The signal processing device 2 repeatedly executes the processing of S11 to S16. If the time width is not included in the first range, the measured time width is the time width of the staircase wave group, and the measured wave height is the wave height of the staircase wave group and does not correspond to the energy of the radiation. If the time range is not included in the first range, the count is not increased by one, which prevents the staircase wave group whose time widths are not included in the first range from being erroneously counted as a single staircase wave. Furthermore, by increasing the count by $k_2$, the number of staircase wave groups whose time widths are included in the first range, which is statistically estimated to be present at a certain ratio with respect to the number of staircase wave groups whose time widths are included in the second range, is subtracted from the count number. This reduces the influence of the staircase wave groups with time widths substantially the same as the time widths of the single staircase waves, in the number of counts of the single staircase waves.

The signal processing device 2 outputs data indicating the relationship between the wave height of the staircase wave and the number of counts counted by the counter unit 25. The analysis device 3 receives an input of the data output by the signal processing device 2. The arithmetic unit 31 of the analysis device 3 generates a spectrum of the radiation detected by the radiation detector 1 based on the input data. The number of counts on which the spectrum is based is the number obtained by subtracting the number of staircase wave groups whose time widths are included in the first range that is statistically estimated based on the number of staircase wave groups whose time widths are not included in the first range, from the number of staircase waves or staircase wave groups whose time widths are included in the first range. This reduces the influence of the staircase wave groups with time widths substantially the same as the time widths of the single staircase waves as much as possible and brings the number of counts of the staircase waves responding to the detection of the radiation closer to the true value. This also prevents occurrence of sum peaks caused by the staircase wave groups with time widths substantially the same as the time width of a single staircase wave in the spectrum. Conventionally, it is difficult to remove the number of staircase wave groups whose time widths are included in the first range from the number of counts counted by the counter unit 25. In the present embodiment, the radiation detection apparatus 10 can generate a spectrum from which sum peaks are adequately removed.

Though the present embodiment employs the time width as a feature corresponding to the time during which a staircase wave or a staircase wave group lasts, the signal processing device 2 may employ the slope of a staircase wave as a feature. For example, tangent lines with respect to a differentiated waveform at two points at which the differential values of a staircase wave take a predetermined threshold are generated, and the point as a midpoint between two points where the two tangent lines cross the horizontal axis is evaluated. Then, the slope of the staircase wave at this point is used as a feature. The longer the time width of the staircase wave is, the gentler the slope of the staircase wave is while the shorter the time width of the staircase wave is, the steeper the slope of the staircase wave is. Accordingly, the slope of the staircase wave or the staircase wave group can be used as a feature corresponding to the time during which the staircase wave or the staircase wave group lasts.

In the mode where a slope is used as a feature, the feature measurement unit 232 measures the slope of a staircase wave or a staircase wave group. For example, the feature measurement unit 232 obtains as a slope the differential value of a staircase wave or a staircase wave group at the point as a midpoint between the two points where two tangent lines of the differential waveform cross the horizontal axis. The processing unit 24 performs the processing by using the slope of the staircase wave or the staircase wave group as a feature. Alternatively, it may use the maximum value of the slope of the staircase wave or the staircase wave group as a feature. For example, the feature measurement unit 232 obtains the maximum value of the differential value of a staircase wave or a staircase wave group as the maximum value of the slope, and the processing unit 24 uses the maximum value of the slope as a feature. In these modes as well, the signal processing device 2 reduces the influence of the staircase wave groups with time widths substantially the same as the time width of the single staircase wave, in the number of counts of the single staircase waves. Likewise, the signal processing device 2 can generate a spectrum from which sum peaks is adequately removed.

Second Embodiment

Figure 10:
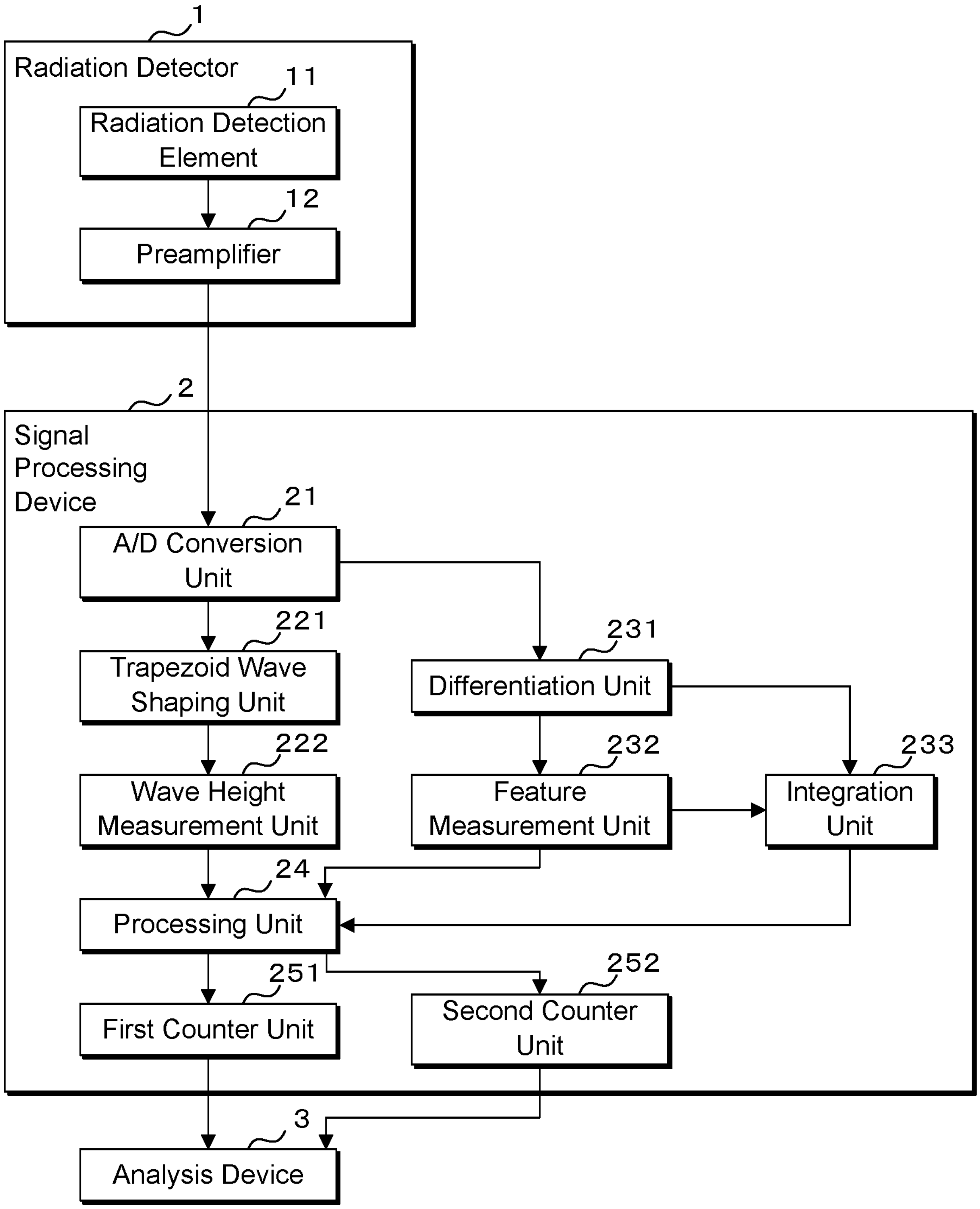
FIG. 10 is a block diagram illustrating a functional configuration of the radiation detector and a signal processing device according to a second embodiment.

The second embodiment depicts an example where staircase waves whose features are included in different ranges are separately counted. The configuration of the parts other than the signal processing device 2 of the radiation detection apparatus 10 is similar to those of the first embodiment. FIG. 10 is a block diagram illustrating a functional configuration of the radiation detector 1 and the signal processing device 2 according to the second embodiment. The radiation detector 1 is similar to those in the first embodiment. The A/D conversion unit 21, the trapezoid wave shaping unit 221 and the wave height measurement unit 222 that are contained in the signal processing device 2 are the same as those in the first embodiment.

The differentiation unit 231 and the feature measurement unit 232 are connected to an integration unit 233. The integration unit 233 is configured with an integrator circuit. The integral unit 233 may be configured with a processor that performs an integral operation. The integration unit 233 accumulates the two adjacent signal values contained in an input signal to integrate the signal. The integration unit 233 receives an input of a differential signal from the differentiation unit 231 and receives an input of a time width (feature) from the feature measurement unit 232. The integration unit 233 integrates the differential signal input from the differentiation unit 231 over the time width input from the feature measurement unit 232 to calculate the wave height of a staircase wave or a staircase wave group.

When the time width of a staircase wave group is long, it takes longer time than the holding time of the trapezoid wave shaping filter used in the trapezoid wave shaping unit 221. When the wave height of a signal is measured by calculating the wave height of a trapezoid wave, the wave height of a signal that rises over a longer period than the holding time cannot accurately be evaluated and is calculated as a value smaller than the actual value. Therefore, for a staircase wave group with a longer time width than a single staircase wave, the calculation with the integration unit 233 offers a more accurate value than the measurement with the wave height measurement unit 222. Since the calculation with the integration unit 233 is greatly affected by noise, the measurement with the wave height measurement unit 222 offers a more accurate wave height for a single staircase wave.

The integration unit 233 is connected to the processing unit 24. The processing unit 24 is connected to a first counter unit 251 and a second counter unit 252. The first counter unit 251 and the second counter unit 252 each count a staircase wave for each wave height. For example, the first counter unit 251 and the second counter unit 252 correspond to a multichannel analyzer. The first counter unit 251 and the second counter unit 252 may be configured to count the number of pulse waves for all the wave heights, or may be configured to count the number of pulse waves only for a specific wave height.

The processing unit 24 receives an input of the wave height from the wave height measurement unit 222, receives an input of the time width of the staircase wave or the staircase wave group from the feature measurement unit 232 and receives an input of the wave height from the integration unit 233. The processing unit 24 stores information to identify the first range and the second range in advance. If the time width measured by the feature measurement unit 232 is included in the first range, the processing unit 24 inputs instructions to the first counter unit 251 to increase the count by one for the wave height measured by the wave height measurement unit 222. The first counter unit 251 makes a count according to the input instructions. If the time width measured by the feature measurement unit 232 is not included in the first range, the processing unit 24 does not input instructions to the first counter unit 251 to make a count, but inputs instructions to the second counter unit 252 to increase the count by one for the wave height calculated by the integration unit 233. The second counter unit 252 makes a count according to the input instructions. The number of counts counted by the second counter unit 252 corresponds to a second count number.

The signal processing device 2 outputs data indicating the relationship between the wave height of the staircase wave or the staircase wave group and the number of counts counted by the first counter unit 251, and outputs data indicating the relationship between the wave height of the staircase wave group and the number of counts counted by the second counter unit 252. The number of counts counted by the first counter unit 251 is the number of staircase waves or staircase wave groups whose time widths are included in the first range. The number of counts counted by the second counter unit 252 is the number of staircase wave groups whose time widths are not included in the first range.

Figure 11:
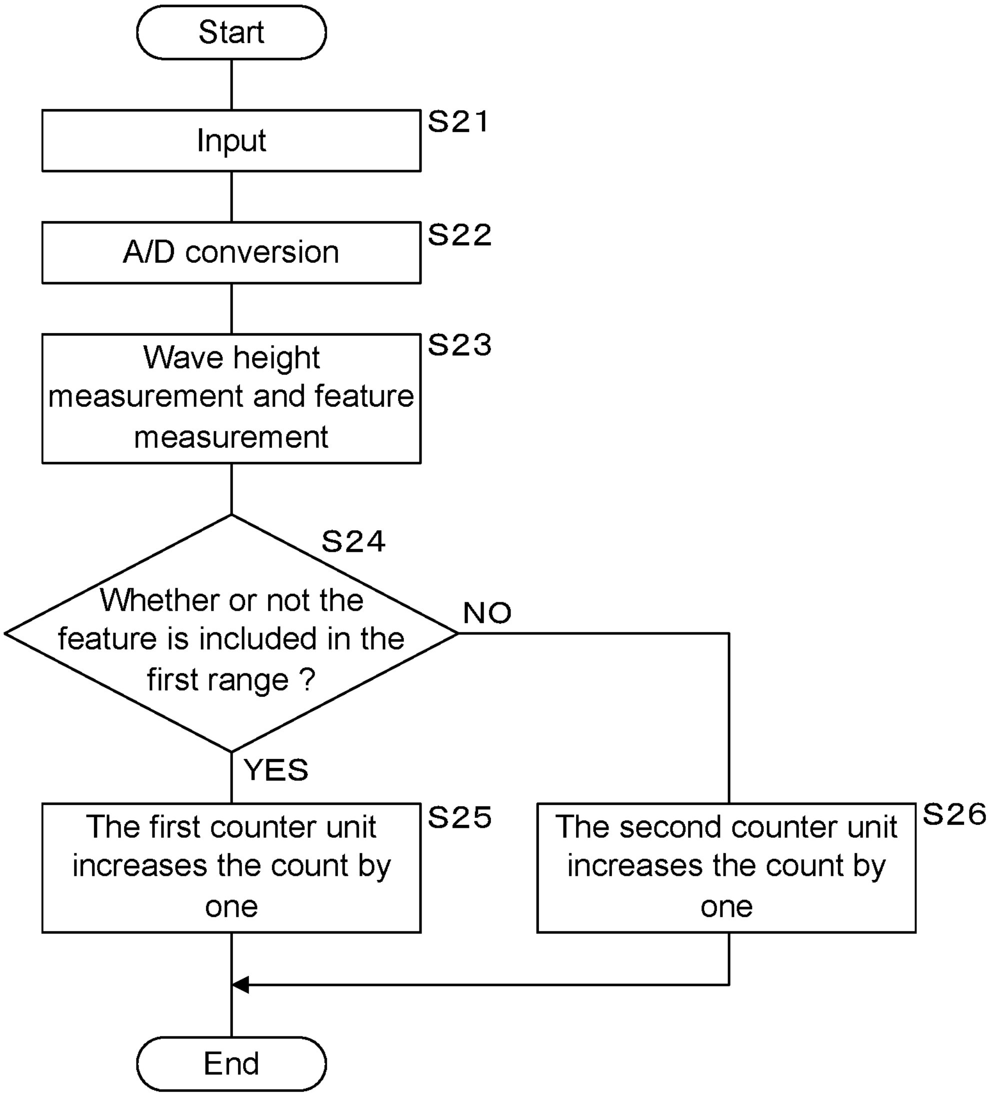
FIG. 11 is a flowchart of a processing procedure to be executed by the signal processing device according to the second embodiment.

FIG. 11 is a flowchart of a processing procedure to be executed by the signal processing device 2 according to the second embodiment. The signal processing device 2 receives an input of a signal including a staircase wave from the radiation detector 1 (S21), and the A/D conversion unit 21 performs A/D conversion on the input signal (S22). The A/D converted signal is subjected to wave height measurement and feature measurement (S23). At S23, the trapezoid wave shaping unit 221 converts the waveform of the signal to a trapezoid wave, and the wave height measurement unit 222 measures the wave height of the staircase wave or the staircase wave group. In addition, the differentiation unit 231 differentiates the signal, the feature measurement unit 232 measures the time width (feature) of the staircase wave or the staircase wave group, and the integration unit 233 integrates the differential signal to calculate the wave height of the staircase wave or the staircase wave group.

The processing unit 24 determines whether or not the time width (feature) measured by the feature measuring unit 232 is included in the first range (S24). If the time width (feature) is included in the first range (S24: YES), the processing unit 24 inputs instructions to the first counter unit 251 to increase the count by one, and the first counter unit 251 increases the count by one for the wave height measured by the wave height measurement unit 222 (S25). At S25, the first counter unit 251 adds one to the number of counts recorded in the channel associated with the wave height measured by the wave height measurement unit 222. If the time width (feature) is not included in the first range (S24: NO), the processing unit 24 inputs instructions to the second counter unit 252 to increase the count by one, and the second counter unit 252 increases the count by one for the wave height calculated by the integration unit 233 (S26). At S26, the second counter unit 252 adds one to the number of counts recorded in the channel associated with the wave height calculated by the integration unit 233. Note that the processing unit 24, if the time width is not included in the first range, may determine whether or not the time width (feature) is included in the second range, and, if the time width is included in the second range, may input instructions to the second counter unit 252 to increase the count by one, and the second counter unit 252 may make a count. The number of counts counted by the first counter unit 251 corresponds to a first count number, and the number of counts counted by the second counter unit 252 corresponds to a second count number.

After completion of the processing of S25 or S26, the signal processing device 2 ends the processing. The signal processing device 2 repeatedly executes the processing of S21 to S26. The signal processing device 2 outputs data indicating the relationship between the wave height of the staircase wave or the staircase wave group and the number of counts counted by the first counter unit 251, and outputs data indicating the relationship between the wave height of the staircase wave group and the number of counts counted by the second counter unit 252. The analysis device 3 receives an input of the data output from the signal processing device 2 and stores the data in the storage unit 34.

Figure 12:
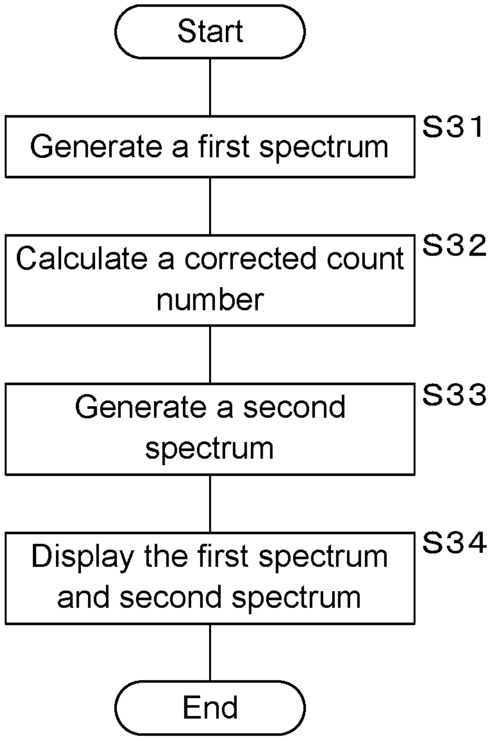
FIG. 12 is a flowchart of a processing procedure to be executed by an analysis device according to the second embodiment.

FIG. 12 is a flowchart of a processing procedure to be executed by the analysis device 3 according to the second embodiment. The arithmetic unit 31 performs the following processing according to the computer program 341. The analysis device 3 generates a first spectrum indicating the relationship between the number of counts counted by the first counter unit 251 and the wave height (S31). At S31, the arithmetic unit 31 generates the first spectrum based on the number of counts counted by the first counter unit 251 and the wave height that are included in the data stored in the storage unit 34. Though signals caused by the staircase wave groups whose time widths are not included in the first range are removed from the first spectrum, signals caused by staircase wave groups whose time widths are included in the first range are not removed. Hence, the first spectrum still contains sum peaks. The processing at S31 corresponds to a first spectrum generation unit.

The analysis device 3 calculates a corrected count number obtained by correcting the number of counts counted by the first counter unit 251 (S32). At S32, the corrected count number is calculated so that a value estimated as the number of staircase wave groups whose time width is included in the first range is subtracted from the number of counts counted by the first counter unit 251 according to the number of staircase wave groups whose time widths are included in the second range. At S32, assuming that the number of counts counted by the first counter unit 251 is $I_1$ and the number of counts counted by the second counter unit 252 is $I_2$, the arithmetic unit 31 calculates the corrected count number $I_C$ by using equation (1) as follows:

$$I_C = I_1 + k_2 I_2 \tag{1}$$

The value of a correction factor $k_2$ is determined based on the settings of the first range and the second range and the probability distribution of the time widths of the double staircase wave groups. As illustrated in FIG. 8, the ratio between the probability of occurrence of the staircase wave groups whose time widths are included in the first range and the probability of occurrence of the staircase wave groups whose time widths are included in the second range is $(a_1/a_2)$. Assuming that the number of staircase wave groups whose time widths are included in the second range is N, the number of staircase wave groups whose time widths are included in the first range is statistically estimated as $(a_1/a_2)$ N. Assuming that the value of the correction factor is $k_2=(-a_1/a_2)$, by adding the value obtained by multiplying the number of staircase wave groups whose time widths are included in the second range by the correction factor $k_2$ to the number of staircase waves or staircase wave groups whose time widths are included in the first range, the value estimated as the number of staircase wave groups whose time widths are included in the first range can be subtracted from the number of staircase waves or staircase wave groups whose time widths are included in the first range. The value of the correction factor $k_2$ is thus defined as $k_2=(-a_1/a_2)$. The value of the correction factor $k_2$ is the same as the count value $k_2$ for correction in the first embodiment. The value of the correction factor $k_2$ is stored in the storage unit 34 in advance. The calculation unit 31 calculates the corrected count number $I_C$ according to equation (1) using the correction factor $k_2$ to thereby correct the number of counts counted by the first counter unit 251. The corrected count number corresponds to a value obtained by correcting the first count number. This correction is made to thereby subtract a statistically estimated value of the number of staircase wave groups whose time widths are included in the first range from the number of counts of the staircase waves or the staircase wave groups whose time widths are included in the first range. The processing of S31 and S32 corresponds to a correction unit.

The arithmetic unit 31 generates a second spectrum indicating the relationship between the corrected count number $I_C$ and the wave height (S33). The second spectrum is a spectrum from which the influence of the staircase wave groups with time widths substantially the same as the time widths of single staircase waves are removed. The processing at S33 corresponds to a second spectrum generation unit.

The arithmetic unit 31 displays the generated first spectrum and second spectrum on the display unit 44 (S34). The analysis device 3 then ends the processing.

Figure 13:
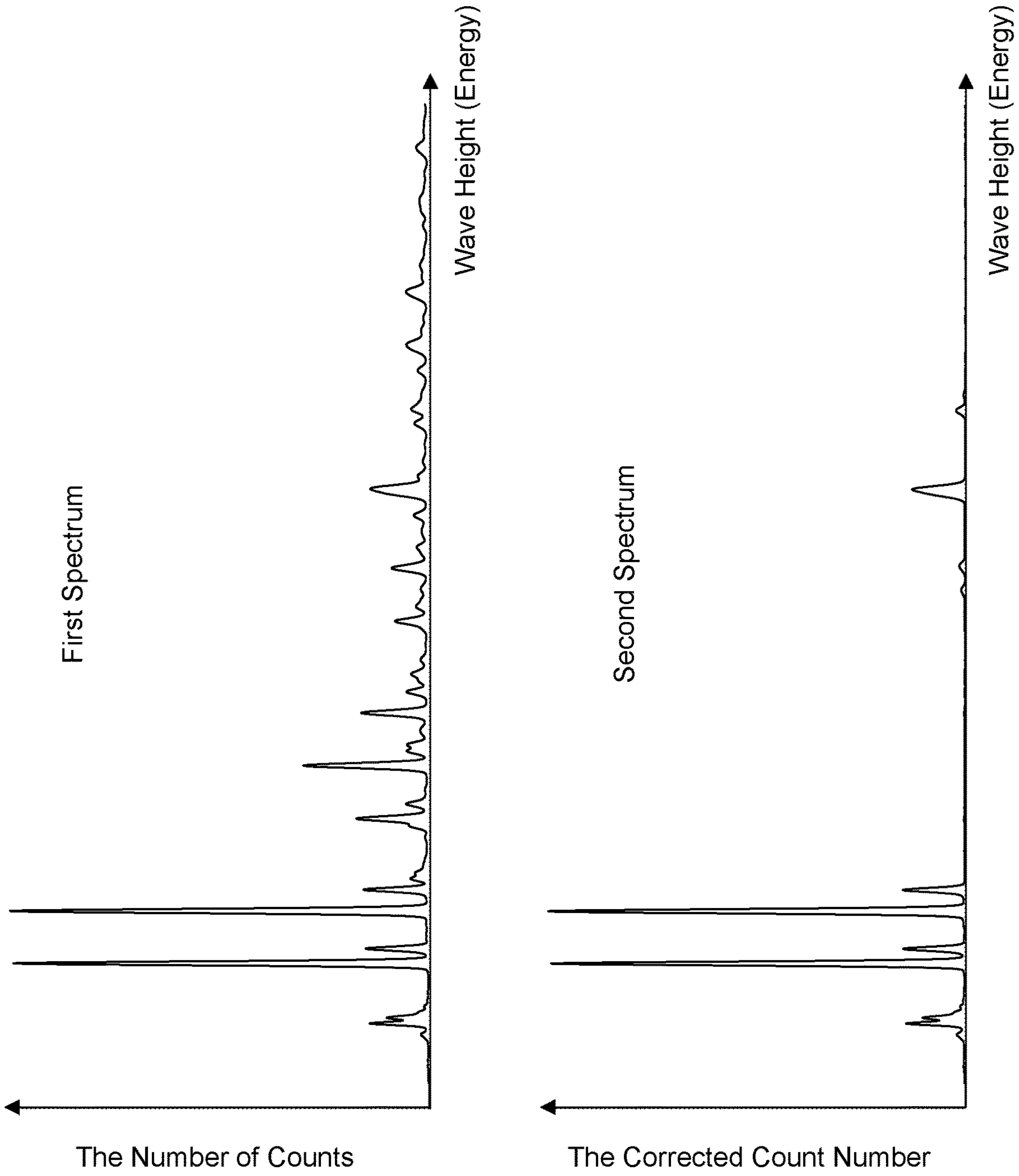
FIG. 13 is a schematic characteristic diagram representing examples of a first spectrum and a second spectrum.

FIG. 13 is a schematic characteristic diagram representing examples of the first spectrum and the second spectrum. The first spectrum is represented at the upper section, and the second spectrum is represented at the lower section. In the drawing, the horizontal axis indicates the wave height of the staircase wave while the vertical axis at the upper section indicates the number of counts by the first counter unit 251, and the vertical axis at the lower section indicates the corrected count number $I_C$. The wave height of the staircase wave corresponds to the energy of the radiation incident to the radiation detection element 11. The number of counts for each energy is the counted number of radiation with each energy. FIG. 13 represents an example where a sample 6 containing elements such as manganese, copper and tin is irradiated with radiation from the irradiation unit 42, and radiation generated from the sample 6 is detected by the radiation detector 1 to generate the first spectrum and the second spectrum.

The number of counts by the first counter unit 251 is the number of staircase waves or staircase wave groups whose time widths are included in the first range and hence includes the number of staircase wave groups whose time widths are included in the first range. Thus, the first spectrum contains sum peaks caused by the staircase wave groups with time widths substantially the same as the time widths of single staircase waves. The corrected count number $I_C$ is the number obtained by subtracting, from the number of staircase waves or staircase wave groups whose time widths are included in the first range, the number of staircase wave groups whose time widths are included in the first range that is statistically estimated based on the number of staircase wave groups whose time widths are included in the second range. This prevents sum peaks caused by the staircase wave group with time widths substantially the same as the time widths of single staircase waves in the second spectrum. As illustrated in FIG. 13, the second spectrum has less peaks than the first spectrum, which shows that sum peaks are removed to a certain extent. As such, the radiation detection apparatus 10 can generate the second spectrum from which sum peaks are adequately removed as a spectrum of radiation.

As described above, in the second embodiment, the radiation detection apparatus 10 generates the first spectrum including sum peaks and the second spectrum from which sum peaks are removed. By comparing the two spectra, the influence of the sum peaks on the spectrum can be confirmed. After comparing the first spectrum and the second spectrum, which spectrum is to be used for elementary analysis can be selected. Alternatively, the first spectrum as to one energy range and the second spectrum as to another energy range are combined to create a composite spectrum, and the elementary analysis may be performed using the composite spectrum. In the second embodiment as well, the signal processing device 2 may use the slope of the staircase wave as a feature.

Third Embodiment

The first and second embodiments depict an example where only a staircase wave group including two overlapping staircase waves is taken into account while the third embodiment depicts a mode where a staircase wave group including three or more overlapping staircase waves is taken into account. The third embodiment mainly depicts an example where a staircase wave group including three or four overlapping staircase waves is taken into account in addition to the staircase wave group including two overlapping staircase waves. Hereafter, the staircase wave group including three overlapping staircase waves is referred to as a triple staircase wave group while the staircase wave group including four overlapping staircase waves is referred to as a quadruple staircase wave group.

Figure 14:
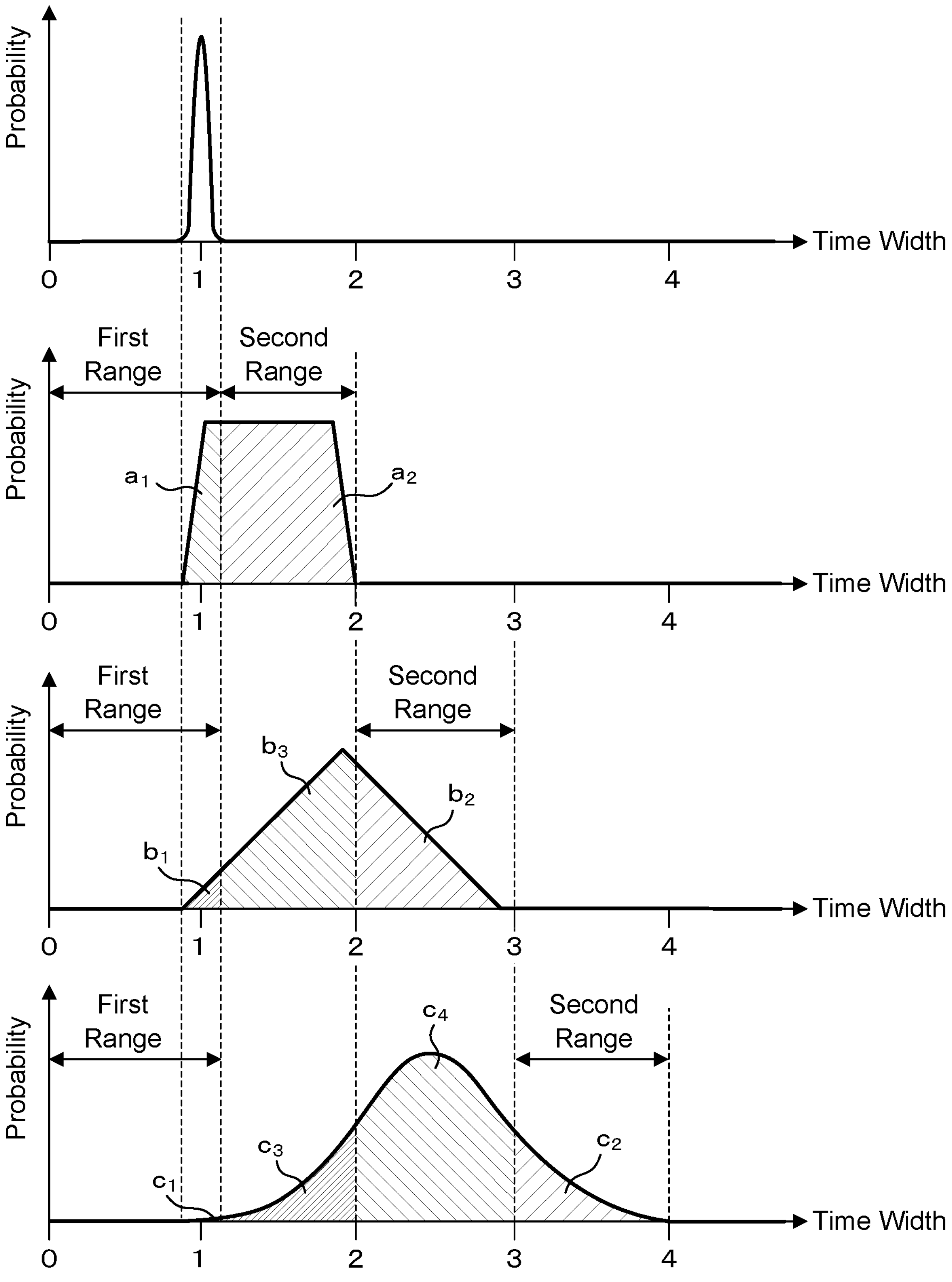
FIG. 14 is a schematic characteristic diagram representing the probability distribution of the time widths of single staircase waves, the probability distribution of the time widths of double staircase wave groups, the probability distribution of the time widths of triple staircase wave groups, and the probability distribution of the time widths of quadruple staircase wave groups.

FIG. 14 is a schematic characteristic diagram representing the probability distribution of the time widths of single staircase waves, the probability distribution of the time widths of double staircase wave groups, the probability distribution of the time widths of triple staircase wave groups and the probability distribution of the time widths of quadruple staircase wave groups. The first graph from the top represents the probability distribution of the time widths of single staircase waves, the second graph from the top represents the probability distribution of the time widths of double staircase wave groups, the third graph from the top represents the probability distribution of the time widths of triple staircase wave groups, and the fourth graph from the top represents the probability distribution of the time widths of quadruple staircase wave groups. In the drawing, the horizontal axis represents a time width, and the numerical values denoted at the horizontal axis are numerical values when the mean value of time widths of the single staircase waves is assumed as 1. The vertical axis represents the probability. FIG. 14 schematically represents an ideal probability distribution.

As described in the first embodiment, the time widths of the single staircase waves are distributed around the mean value while the time widths of the double staircase wave groups are substantially uniformly distributed for the probability distribution. The time widths of the triple staircase wave groups are distributed from the lower limit the same as that of the time width of the single staircase wave to nearly triple the mean value of the time widths of the single staircase waves. The third staircase waves overlapping the uniformly distributed double staircase wave groups are distributed uniformly, so that the probability distribution of the time widths of triple staircase wave groups substantially exhibits triangular distribution as illustrated in FIG. 14.

The time widths of the quadruple staircase wave groups are distributed from the lower limit the same as that of the time width of the single staircase wave to nearly quadruple the mean value of the time widths of the single staircase waves. The fourth staircase waves respectively overlapping the triangularly-distributed triple staircase wave groups are distributed uniformly, so that the probability distribution of the time widths of quadruple staircase wave groups are distributed as illustrated in FIG. 14. As to the staircase wave groups including five or more overlapping staircase waves, a probability distribution of the time widths can be obtained similarly. The more the number of staircase waves overlap, the closer the probability distribution of the time widths of the staircase wave groups is to normal distribution.

As illustrated in FIG. 14, also in the staircase wave groups including three or more overlapping staircase waves, some staircase wave groups with time widths substantially the same as the time widths of single staircase waves are present. That is, there are some staircase wave groups whose time widths are included in the first range. If the staircase wave group with three or more overlapping staircase waves whose time width is included in the first range is erroneously counted as a single staircase wave, sum peaks may be caused.

The second range is also set for each of the staircase wave groups including three or more overlapping staircase waves. Each second range starts after a lapse of the time range corresponding to the first range. For the triple staircase wave group, an upper limit that is taken by the possible values of the time widths of triple staircase waves is set, and a predetermined time range starting after the upper limit of the time width of the double staircase wave groups to the set upper limit is assumed as a second range. For the quadruple staircase wave group, an upper limit that is taken by the possible values of the time widths of quadruple staircase waves is set, and a predetermined time range starting after the upper limit of the time width of the triple staircase wave groups to the set upper limit is assumed as a second range. Likewise, a second range can be set for the staircase wave groups including five or more overlapping staircase waves.

The second ranges related to the double, triple and quadruple staircase wave groups are different from one another and do not overlap one another. The second range for one staircase wave group is so set as not to include a time width of another staircase wave group in which smaller number of staircase waves overlap compared to the staircase waves included in the one stair case wave group. For example, as illustrated in FIG. 14, the second range related to the triple staircase wave group ranges from the value double to triple the mean value of the time widths of the single staircase waves, and the second range related to the quadruple staircase wave group ranges from the value triple to quadruple the mean value of the time widths of the single staircase waves. There may be a gap between the multiple second ranges. The upper limit that can be taken by the time width of the staircase wave groups including the largest number of overlapping stair case waves may be limitless. In the case where the quadruple staircase wave groups are taken into account, for example, the upper limit taken by the time width of the quadruple staircase wave groups may be limitless.

As illustrated in FIG. 14, the staircase wave groups whose time widths are included in the second range related to the double staircase wave groups may include the triple staircase wave groups and the quadruple staircase wave groups in addition to the double staircase wave groups. Likewise, the staircase wave groups whose time widths are included in the second range related to the triple staircase wave groups include the quadruple staircase wave groups in addition to the triple staircase wave groups. That is, the second range varies depending on the minimum value of the number of staircase waves that can be included in the staircase wave group.

The integral in the first range and the integral in the second range of the probability distribution of the time widths of the triple staircase wave groups are assumed as $b_1$ and $b_2$, respectively. The ratio between the probability of occurrence of the triple staircase wave groups whose time widths are included in the first range and the probability of occurrence of the triple staircase wave groups whose time widths are included in the second range is $(b_1/b_2)$. The integral of the probability distribution of the time widths of the triple staircase wave groups in the second range related to the double staircase wave groups is assumed as $b_3$.

The integral in the first range and the integral in the second range of the probability distribution of the time widths of the quadruple staircase wave groups are assumed as $c_1$ and $c_2$, respectively. The ratio between the probability of occurrence of the quadruple staircase wave groups whose time widths are included in the first range and the probability of occurrence of the quadruple staircase wave groups whose time widths are included in the second range is $(c_1/c_2)$. The integral of the probability distribution of the time widths of the quadruple staircase wave groups in the second range related to the double staircase wave groups are assumed as $c_3$, and the integral of the probability distribution of the time widths of the quadruple staircase wave groups in the second range related to the triple staircase wave groups are assumed as $c_4$.

The to-be corrected count number of the staircase waves or the staircase wave groups whose time widths are included in the first range is assumed as $I_1$, the number of counts of the staircase wave groups whose time widths are included in the second range related to the double staircase wave group is assumed as $I_2$, the number of counts of the staircase wave groups whose time widths are included in the second range related to the triple staircase wave group is assumed as $I_3$, and the number of counts of the staircase wave groups whose time widths are included in the second range related to the quadruple staircase wave group is assumed as $I_4$. The number obtained by subtracting the estimated number of staircase wave groups whose time widths are included in the first range from the to-be corrected count number $I_1$ is referred to as a corrected count number $I_C$. The corrected count number $I_C$ is calculated according to equation (2) below where $k_2$, $k_3$ and $k_4$ are the correction factors.

$$I_C = I_1 + k_2 I_2 + k_3 I_3 + k_4 I_4 \tag{2}$$

As described above, the staircase wave groups whose time widths are included in the second range related to the double staircase wave group include the double staircase wave groups, the triple staircase wave groups and the quadruple staircase wave groups. In addition, the staircase wave groups whose time widths are included in the second range related to the triple staircase wave group include the triple staircase wave groups and the quadruple staircase wave groups. The number of double staircase wave groups whose time widths are included in the second range related to the double staircase wave groups is assumed as $I_2'$, the number of triple staircase wave groups whose time widths are included in the second range related to the triple staircase wave groups is assumed as $I_3'$, and the number of quadruple staircase wave groups whose time widths are included in the second range related to the quadruple staircase wave groups is assumed as $I_4'$. The corrected count number $I_C$ is calculated according to equation (3) as follows:

$$Ic = I_1 + (-a_1/a_2)I_2' + (-b_1/b_2)I_3' + (-c_1/c_2)I_4' \tag{3}$$

If the staircase wave groups up to the quadruple staircase wave groups are taken into account, $I_4'=I_4$. The number of quadruple staircase wave groups whose time widths are included in the second range related to the triple staircase wave groups is $(c_4/c_2)$ $I_4$, so $I_3'=13-(c_4/c_2)$ $I_4$. The number of quadruple staircase wave groups whose time widths are included in the second range related to the double staircase wave groups is $(c_3/c_2)$ $I_4$, and the number of triple staircase wave groups whose time widths are included in the second range related to the double staircase wave groups is $(b_3/b_2)$ $I_3'$. Therefore, $I_2'$ is expressed by equation (4) as follows:

$$I_2' = I_2 - (b_3/b_2)I_3' - (c_3/c_2)I_4 \tag{4}$$

-continued $$= I_2 - (b_3/b_2)\{I_3 - (c_4/c_2)I_4\} - (c_3/c_2)I_4$$

$$= I_2 - (b_3/b_2)I_3 + \{(b_3/b_2)(c_4/c_2) - (c_3/c_2)\}I_4$$

Substituting $I_3'$ and $I_2'$ in equation (3) yields equation (5) as follows:

$$Ic = I_1 + (-a_1/a_2)I_2 + \{(a_1/a_2)(b_3/b_2) - (b_1/b_2)\} \quad (5)$$

$$I_3 + [(a_1/a_2)\{(c_3/c_2) - (b_3/b_2)(c_4/c_2)\} + (b_1/b_2)(c_4/c_2) - (c_1/c_2)]$$

By comparing equation (2) with equation (5), the correction factors $k_2$, $k_3$, and $k_4$ are determined as equation (6), equation (7) and equation (8) as follows:

$$k_2 = (-a_1/a_2) \quad (6)$$

$$k_3 = \{(a_1/a_2)(b_3/b_2) - (b_1/b_2)\} \quad (7)$$

$$k_4 = [(a_1/a_2)\{(c_3/c_2) - (b_3/b_2)(c_4/c_2)\} + (b_1/b_2)(c_4/c_2) - (c_1/c_2)] \quad (8)$$

In the case of taking int account a staircase wave group including five or more overlapping staircase waves as well, the correction factor can be determined similarly.

Figure 15:
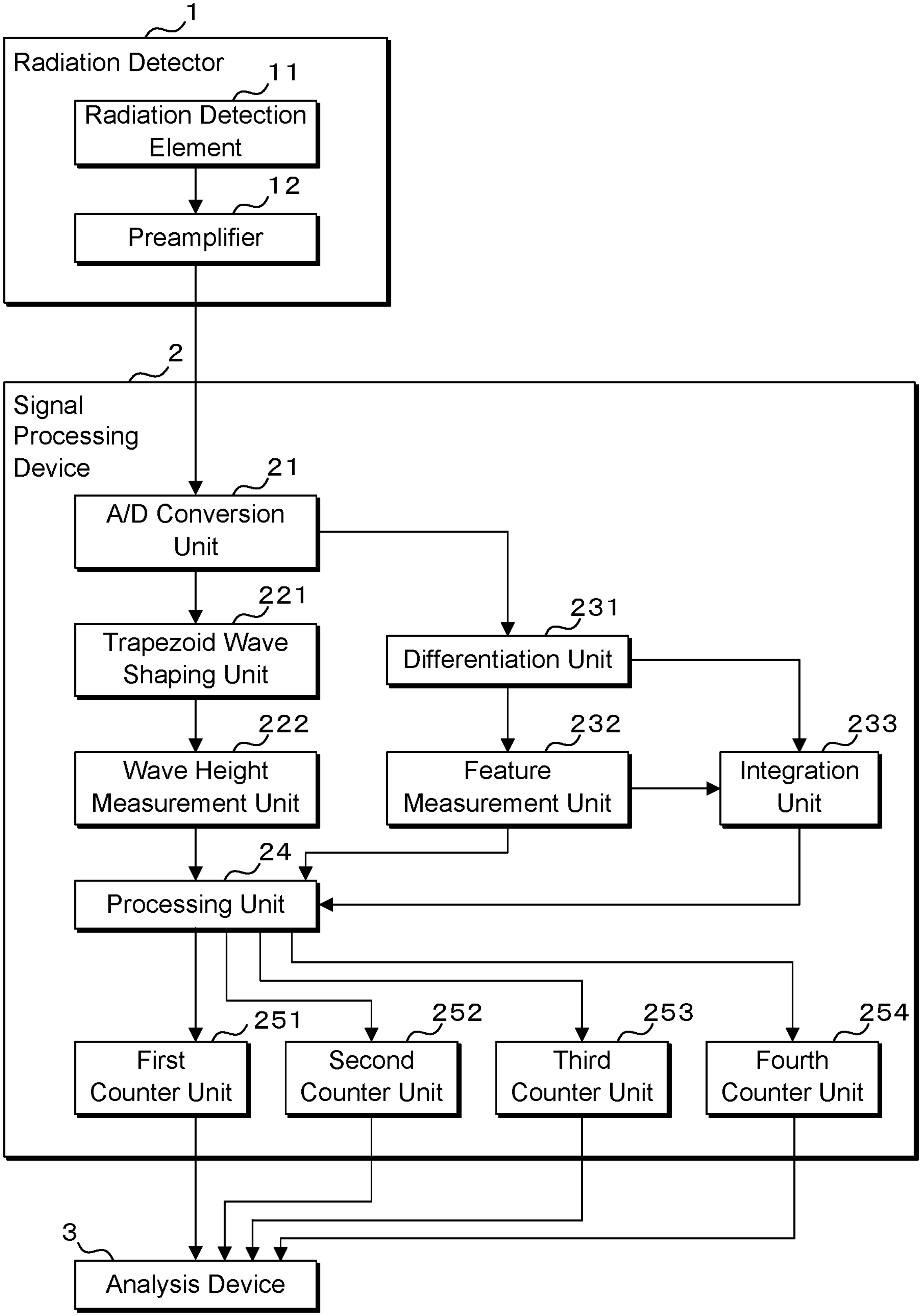
FIG. 15 is a block diagram illustrating a functional configuration of the radiation detector and a signal processing device according to a third embodiment.

The configurations of the parts other than the signal processing device 2 of the radiation detection apparatus 10 are similar to those in the first embodiment and the second embodiment. FIG. 15 is a block diagram illustrating a functional configuration of the radiation detector 1 and the signal processing device 2 according to the third embodiment. The radiation detector 1 is similar to those of the first and second embodiments. The A/D conversion unit 21, the trapezoid wave shaping unit 221, the wave height measurement unit 222, the differentiation unit 231, the feature measurement unit 232 and the integration unit 233 that are contained in the signal processing device 2 are the same as those in the second embodiment.

The processing unit 24 is connected to the first counter unit 251, the second counter unit 252, a third counter unit 253 and a fourth counter unit 254. The first counter unit 251, the second counter unit 252, the third counter unit 253 and the fourth counter unit 254 count the number of staircase waves for each height. For example, the first counter unit 251, the second counter unit 252, the third counter unit 253 and the fourth counter unit 254 correspond to a multichannel analyzer. The first counter unit 251, the second counter unit 252, the third counter unit 253 and the fourth counter unit 254 may be configured to count the number of pulse waves for all the wave heights, or may be configured to count the number of pulse waves only for a specific wave height.

The processing unit 24 receives an input of the wave height from the wave height measurement unit 222, receives an input of the time width of a staircase wave or a staircase wave group from the feature measurement unit 232 and receives an input of the wave height from the integration unit 233. The processing unit 24 stores information to identify the first range and multiple second ranges in advance. If the time width measured by the feature measurement unit 232 is included in the first range, the processing unit 24 inputs instructions to the first counter unit 251 to increase the count by one for the wave height measured by the wave height measurement unit 222. If the time width is included in the second range related to the double staircase wave group, the processing unit 24 inputs instructions to the second counter unit 252 to increase the count by one for the wave height calculated by the integration unit 233. If the time width is included in the second range related to the triple staircase wave group, the processing unit 24 inputs instructions to the third counter unit 253 to increase the count by one for the wave height calculated by the integration unit 233. If the time width is included in the second range related to the quadruple staircase wave group, the processing unit 24 inputs instructions to the fourth counter unit 254 to increase the count by one for the wave height calculated by the integration unit 233. The first counter unit 251, the second counter unit 252, the third counter unit 253 and the fourth counter unit 254 make counts according to the input instructions.

The signal processing device 2 outputs data indicating the relationship between the wave height of a staircase wave or a staircase wave group and the numbers of counts counted by the first counter unit 251, the second counter unit 252, the third counter unit 253 and the fourth counter unit 254. The number of counts counted by the first counter unit 251 is the number of counts obtained by counting the number of staircase waves or staircase wave groups whose time widths are included in the first range. The number of counts counted by the second counter unit 252 is the number of counts obtained by counting the number of staircase wave groups whose time widths are included in the second range related to the double staircase wave group. The number of counts counted by the third counter unit 252 is the number of counts obtained by counting the number of staircase wave groups whose time widths are included in the second range related to the tripled staircase wave group. The number of counts counted by the fourth counter unit 254 is the number of counts obtained by counting the number of staircase wave groups whose time widths are included in the second range related to the quadruple staircase wave group.

Figure 16:
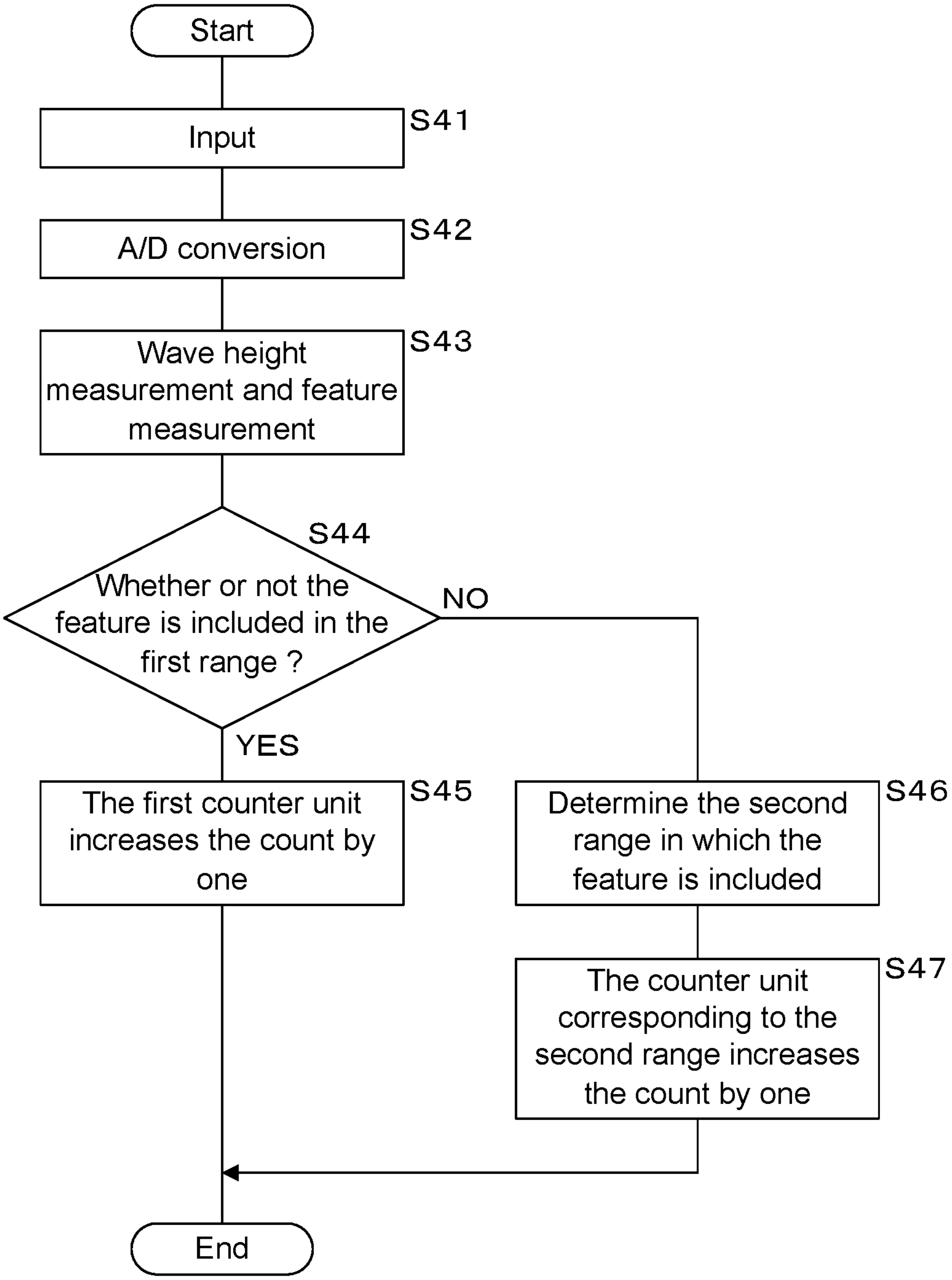
FIG. 16 is a flowchart of a processing procedure to be executed by the signal processing device according to the third embodiment.

FIG. 16 is a flowchart of a processing procedure to be executed by the signal processing device 2 according to the third embodiment. The signal processing device 2 receives an input of a signal including a staircase wave from the radiation detector 1 (S41), and the A/D conversion unit 21 performs A/D conversion on the input signal (S42). The A/D converted signal is subjected to wave height measurement and feature measurement (S43). At S43, the trapezoid wave shaping unit 221 converts the waveform of the signal to a trapezoid wave, and the wave height measurement unit 222 measures the wave height of the staircase wave or the staircase wave group. The differentiation unit 231 further differentiates the signal, the feature measurement unit 232 measures the time width (feature) of the staircase wave or the staircase wave group, and the integration unit 233 integrates the differential signal to calculate the wave height of the staircase wave or the staircase wave group.

The processing unit 24 determines whether or not the time width (feature) measured by the feature measurement unit 232 is included in the first range (S44). If the time width (feature) is included in the first range (S44: YES), the processing unit 24 inputs instructions to the first counter unit 251 to increase the count by one, and the first counter unit 251 increases the count by one for the wave height measured by the wave height measurement unit 222 (S45). At S45, the first counter unit 251 adds one to the number of counts recorded in the channel associated with the wave height measured by the wave height measurement unit 222. If the time width (feature) is not included in the first range (S44: NO), the processing unit 24 determines the second range in which the time width (feature) is included (S46). For example, at S46, the processing unit 24 determines in which second range the time width is included, the second range related to the double staircase wave group, the second range related to the triple staircase wave group, and the second range related to the quadruple staircase wave group. The processing unit 24 inputs instructions to the counter unit corresponding to the second range in which the time width is included to increase the count by one, and the relevant counter unit increases the count by one for the wave height calculated by the integration unit 233 (S47).

As described above, at S47, if the time width is included in the second range related to the double staircase wave group, the second counter unit 252 increases the count by one for the wave height calculated by the integration unit 233. That is, the second counter unit 252 adds one to the number of counts recorded in the channel associated with the wave height calculated by the integration unit 233. If the time width is included in the second range related to the triple staircase wave group, the third counter unit 253 increases the count by one for the wave height calculated by the integration unit 233. That is, the third counter unit 253 adds one to the number of counts recorded in the channel associated with the wave height calculated by the integration unit 233. If the time width is included in the second range related to the quadruple staircase wave group, the fourth counter unit 254 increases the count by one for the wave height calculated by the integration unit 233. That is, the fourth counter unit 254 adds one to the number of counts recorded in the channel associated with the wave height calculated by the integration unit 233. Note that if the time width is not included in any of the second ranges, the processing unit 24 may perform processing of causing any counter unit not to make a count. The processing unit 24 corresponds to a determination unit. The number of counts counted by the first counter unit 251 corresponds to a first count number. The numbers of counts counted by the second counter unit 252, the third counter unit 253 and the fourth counter unit 254 correspond to a second count number.

After completion of the processing of S45 or S47, the signal processing device 2 ends the processing. The signal processing device 2 repeatedly executes the processing of S41 to S47. The signal processing device 2 outputs data indicating the relationship between the wave height of a staircase wave or a staircase wave group and the numbers of counts counted by the first counter unit 251, the second counter unit 252, the third counter unit 253 and the fourth counter unit 254. The analysis device 3 receives an input of the data output by the signal processing device 2 and stores the data in the storage unit 34.

The analysis device 3 performs the processing of S31 to S34. At S32, the arithmetic unit 31 calculates the corrected count number $I_C$ using equation (2) regarding the number of counts by the first counter unit 251 as $I_1$, the number of counts by the second counter unit 252 as $I_2$, the number of counts by the third counter unit 253 as $I_3$ and the number of counts by the fourth counter unit 254 as $I_4$. The correction factors $k_2$, $k_3$, and $k_4$ contained in equation (2) are expressed by equation (6), equation (7) and equation (8), respectively. The specific values of the correction factors $k_2$, $k_3$ and $k_4$ are stored in the storage unit 34 in advance. The arithmetic unit 31 calculates the corrected count number $I_C$ using the correction factor stored in the storage unit 34 to correct the number of counts $I_1$ by the first counter unit 251. At step S33, the arithmetic unit 31 generates a second spectrum based on the corrected count number $I_C$ calculated. According to the processing of S31 to S34, the analysis device 3 generates the first spectrum and the second spectrum as illustrated in FIG. 13 and displays them on the display unit 44.

The multiple second ranges are set in advance so as not to overlap one another. Each second range is defined for each minimum value of the number of staircase waves that can be included in the staircase wave group. The values of the correction factors $k_2$, $k_3$ and $k_4$ are determined in advance according to the multiple second ranges. The values of the correction factors $k_2$, $k_3$, and $k_4$ may be determined theoretically or experimentally with standard samples by the radiation detection apparatus 10. The values of the correction factors $k_2$, $k_3$ and $k_4$ are constants unique for the radiation detection apparatus 10 regardless of the measurement conditions or the difference in the sample 6. Therefore, if the correction factors are determined and are stored at the time of manufacture of the radiation detection apparatus 10, the radiation detection apparatus 10 can perform the correction processing at all times.

In the third embodiment as well, the radiation detection apparatus 10 generates the second spectrum. The corrected count number $I_C$ is the number obtained by subtracting, from the number of counts of the staircase waves or the staircase wave groups whose time widths are included in the first range, the number of staircase wave groups with time widths included in the first range including two to four overlapping staircase waves that is statistically estimated based on the number of staircase wave groups whose time widths are included in any one of the multiple second range. This reduces the influence of the staircase wave groups with time widths substantially the same as the time width of the single staircase wave as much as possible and brings the number of counts of the staircase waves responding to the detection of the radiation closer to the true value. This also prevents occurrence of sum peaks caused by the staircase wave groups with time widths substantially the same as the time widths of single staircase waves in the second spectrum. The radiation detection apparatus 10 can generate a more precise second spectrum from which sum peaks have adequately been removed. In the third embodiment as well, the first spectrum including sum peaks and the second spectrum from which sum peaks are removed can be compared. In addition, a first spectrum as to one energy range and a second spectrum as to another energy range are combined to be used as a composite spectrum.

It is noted that the signal processing device 2 may be an example where a staircase wave group including five or more overlapping staircase waves may be taken into account. In this example as well, the signal processing device 2 has counter units corresponding to the number of staircases included in a staircase wave group, and the second ranges are set corresponding to the number of staircase waves included in a staircase wave group. The counter unit corresponding on the second range in which the time width (feature) is included makes a count. The analysis device 3 calculates a corrected count number $I_C$ using the correction factor determined according to the number of staircase waves included in a staircase wave group to generate the second spectrum. In this example as well, the radiation detection apparatus 10 can generate a more precise second spectrum, from which sum peaks have adequately been removed. In the third embodiment as well, the signal processing device 2 may be configured to use the slope of the staircase wave as a feature. Alternatively, the signal processing device 2 may be configured to correct the number of counts according to the configuration described in the first embodiment in the case where a feature is included in the second range related to the staircase wave group including three or more overlapping staircase waves in addition to the case where a feature is included in the second range related to the double staircase wave group.

Fourth Embodiment

Figure 17:
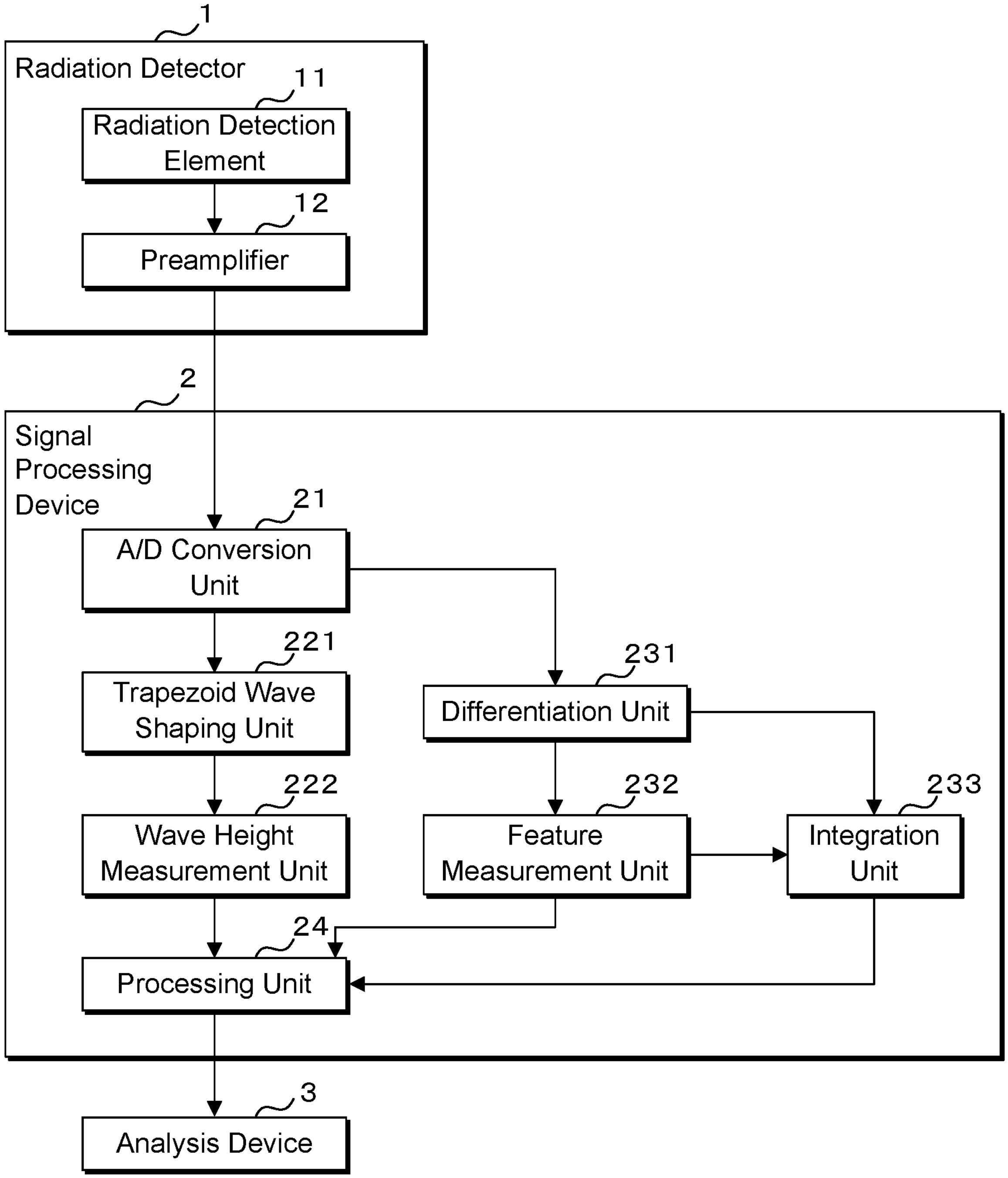
FIG. 17 is a block diagram illustrating a functional configuration of the radiation detector and a signal processing device according to a fourth embodiment.

The fourth embodiment 4 depicts an example where counting radiation is performed by the analysis device 3. The configurations of the parts other than a signal processing device 2 of the radiation detection apparatus 10 are similar to those of the first to third embodiments. FIG. 17 is a block diagram illustrating a functional configuration of the radiation detector 1 and the signal processing device 2 according to the fourth embodiment. The radiation detector 1 is similar to those in the first to third embodiments. The A/D conversion unit 21, the trapezoid wave shaping unit 221, the wave height measurement unit 222, the differentiation unit 231, the feature measurement unit 232 and the integration unit 233 that are contained in the signal processing device 2 are the same as those in the second and third embodiments.

The signal processing device 2 does not have a counter unit. The processing unit 24 receives an input of the wave height from the wave height measurement unit 222, receives an input of the time width of a staircase wave or a staircase wave group from the feature measurement unit 232 and receives an input of the wave height from the integration unit 233. The processing unit 24 stores information to identify the first range and the respective second ranges in advance. The processing unit 24 determines the range in which the time width is included. The processing unit 24 inputs the information including the determination result of the range and the wave height to the analysis device 3. The analysis device 3 makes a count corresponding to the range in which the time width is included according to the information input from the processing unit 24.

Figure 18:
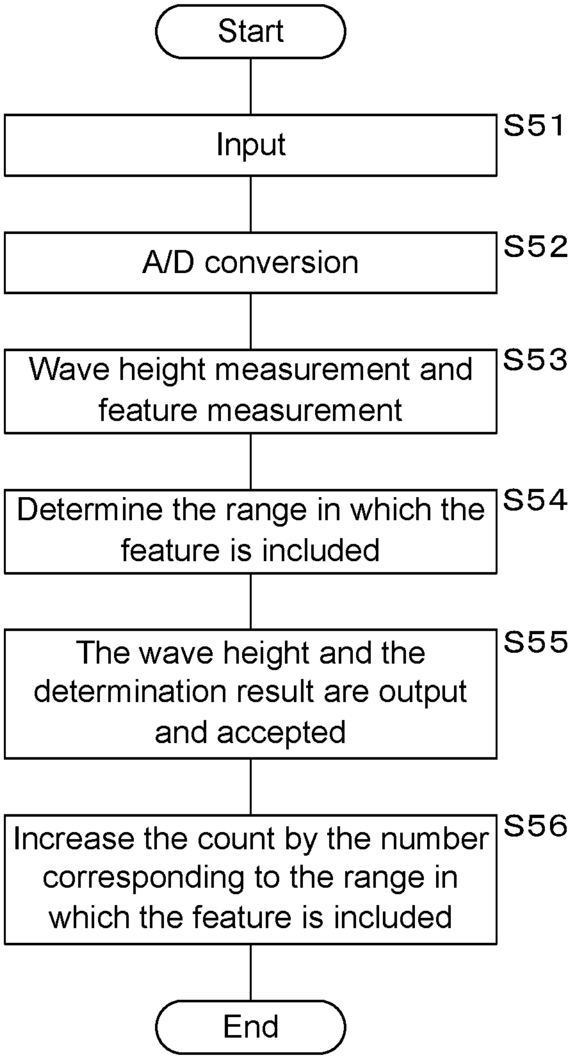
FIG. 18 is a flowchart of a processing procedure to be executed by the signal processing device and an analysis device according to the fourth embodiment.

FIG. 18 is a flowchart of a processing procedure to be executed by the signal processing device 2 and the analysis device 3 according to the fourth embodiment. The signal processing device 2 receives an input of a signal including a staircase wave from the radiation detector 1 (S51), and the A/D conversion unit 21 performs A/D conversion on the input signal (S52). The A/D converted signal is subjected to wave height measurement and feature measurement (S53). At S53, the trapezoid wave shaping unit 221 converts the waveform of the signal to a trapezoid wave, and the wave height measurement unit 222 measures the wave height of the staircase wave or the staircase wave group. The differentiation unit 231 differentiates the signal, the feature measurement unit 232 measures the time width (feature) of the staircase wave or the staircase wave group, and the integration unit 233 integrates the differential signal to calculate the wave height of the staircase wave or the staircase wave group.

The processing unit 24 determines the range in which the time width (feature) measured by the feature measurement unit 232 is included (S54). At step S54, the processing unit 24 determines whether or not the time width is included in the first rage, and determines the second range in which the time width is included if the time width is not included in the first rage. For example, the processing unit 24 determines which second range the time width is included in, the second range related to the double staircase wave group, the second range related to the triple staircase wave group and the second range related to the quadruple staircase wave group. The processing at S54 corresponds to a determination unit.

The processing unit 24 then outputs the information including the wave height and the determination result of the range, and the analysis device 3 accepts the output information (S55). At S55, the processing unit 24, if the time width is included in the first range, inputs to the analysis device 3 information including the time width measured by the wave height measurement unit 222 and the determination result indicating that the wave height is included in the first range. The processing unit 24, if the time width is included in any one of the second ranges, inputs to the analysis device 3 the information including the wave height calculated by the integration unit 233 and the determination result indicating the second range in which the time width is included. The analysis device 3 stores the input information in the storage unit 34.

The analysis device 3 increases, for each wave height, the count by the number corresponding to the range in which the time width (feature) is included (S56). The analysis device 3 stores in the storage unit 34, for each wave height, the number corresponding to the range in which the time width is included. For example, the analysis device 3 stores in association with the wave height in the storage unit 34 the numbers corresponding to the numbers of counts by the first counter unit 251, the second counter unit 252, the third counter unit 253 and the fourth counter unit 254 in the third embodiment. At S56, the arithmetic unit 31 specifies the range in which the time width is included according to the determination result included in the input information and adds one to the number corresponding to the specified range that is stored in association with the wave height included in the information. The processing at S56 corresponds to a correction unit.

The number stored by the analysis device 3 in the storage unit 34 is the number of staircase waves or staircase wave groups counted for each wave height and for each range in which the time width is included. For example, the numbers stored in the storage unit 34 by the analysis device 3 include the number of counts obtained by counting, for each wave height, the number of staircase waves or staircase wave groups whose time widths are included in the first range, the number of counts obtained by counting, for each wave height, the number of staircase wave groups whose time widths are included in the second range related to the double staircase wave group, the number of counts obtained by counting, for each wave height, the number of staircase wave groups whose time widths are included in the second range related to the triple staircase wave group, and the number of counts obtained by counting, for each wave height, the number of staircase wave groups whose time widths are included in the second range related to the quadruple staircase wave group. The number of counts obtained by counting the number of staircase waves or staircase wave groups whose time widths are included in the first range corresponds to a first count number. The number of counts obtained by counting the staircase wave groups whose time widths are included in any one of the second ranges corresponds to a second count number. After completion of the processing of S56, the analysis device 3 ends the processing. The signal processing device 2 and the analysis device 3 repeatedly execute the processing of S51 to S56.

The analysis device 3 executes the processing of S31 to S34. At S31, the arithmetic unit 31 generates a first spectrum based on the number obtained by counting, for each wave height, the number of staircase waves or staircase wave groups whose time widths are included in the first range. At S32, for example, the arithmetic unit 31 calculates a corrected count number $I_C$ using equation (2) based on the number stored in the storage unit 34 corresponding to the range in which the time width is included. The values of the correction factors $k_2$, $k_3$ and $k_4$ are stored in the storage unit 34 in advance. The corrected count number $I_C$ is the number obtained by subtracting, from the number of staircase waves or staircase wave groups whose time widths are included in the first range, the number of staircase wave groups whose time widths are included in the first range that is statistically estimated based on the number of staircase wave groups whose time widths are included in the second range. At S33, the arithmetic unit 31 generates a second spectrum based on the corrected count number $I_C$ calculated. By the processing of S31 to S34, the analysis device 3 generates the first spectrum and the second spectrum as illustrated in FIG. 13 and displays them on the display unit 44.

In the fourth embodiment as well, the radiation detection apparatus 10 generates the second spectrum in which the effect of staircase wave groups with time widths substantially the same as the time widths of single staircase waves is reduced. This makes it possible for the radiation detection apparatus 10 to generate the second spectrum from which sum peaks are adequately removed as a spectrum of radiation. In the fourth embodiment as well, the first spectrum including sum peaks and the second spectrum from which sum peaks are removed can be compared. In addition, a first spectrum as to one energy range and a second spectrum as to another energy range are combined to use a composite spectrum.

In the fourth embodiment as well, the radiation detection apparatus 10 may use the slope of a staircase wave as a feature. Alternatively, as in the first embodiment, the radiation detection apparatus 10 may be configured to correct the number of counts obtained by counting the number of staircase waves or staircase wave groups whose features are included in the first range every time it is determined that the feature is not included in the first range.

In the first to fourth embodiments, the radiation detection apparatus 10 may be configured to correct the time width as a feature depending on the wave height. In this example, the time width of a staircase wave in response to one event is corrected so as to be constant independent of the wave height. For example, the processing unit 24 corrects the wave height by dividing the time width by the wave height. As the wave height of the staircase wave increases, the time width of the staircase wave intends to increase. Correcting the time width makes it possible to sort staircase waves or staircase wave groups without being affected by the size of the wave height. Alternatively, the radiation detection apparatus 10 may be configured to define the first range or the second range for each wave height. In this example as well, staircase waves or staircase wave groups are sorted without being affected by the size of the wave height.

Fifth Embodiment

Figure 19:
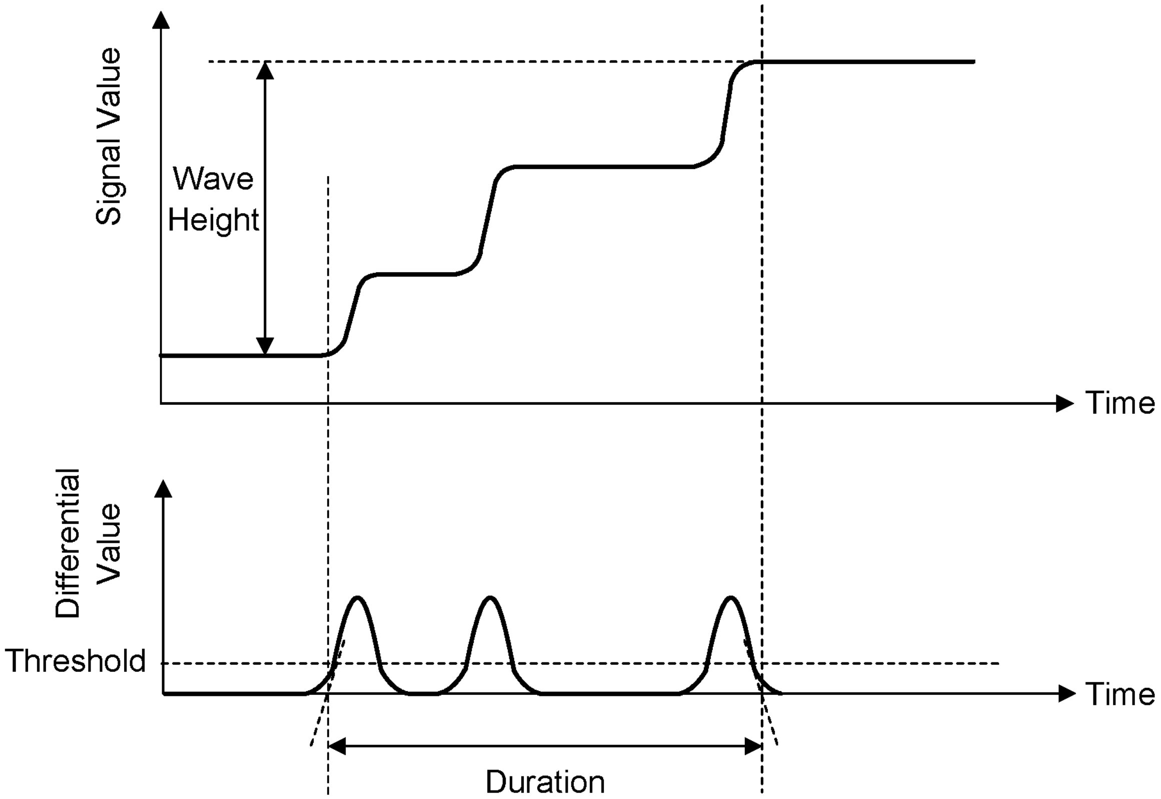
FIG. 19 is a schematic characteristic diagram representing an example of multiple staircase waves spaced from one another and their differentiated waveforms.

The fifth embodiment depicts an example where the duration of a staircase wave or a staircase wave group is used as a feature. FIG. 19 is a schematic characteristic diagram representing an example of multiple staircase waves spaced from each other and their differentiated waveforms. A signal consisting of staircase waves is represented at the upper section while the differential signal is represented at the lower section. In the drawing, the horizontal axis represents time, the vertical axis at the upper section represents a signal value, and the vertical axis at the lower section represents a differential value. The multiple staircase waves in FIG. 19 are sufficiently separated and do not overlap one another. The multiple staircase waves thus separated are also considered as a single staircase wave group.

The height of the staircase or step at which the signal value rises by a staircase wave group is assumed as a wave height of the staircase wave group. Tangent lines are generated with respect to a differentiated waveform at one point where the differential value of the staircase wave group takes a predetermined threshold first and a point where the differential value takes a predetermined threshold last, and the length of time between two points where the two tangent lines cross the horizontal axis is defined as a duration of the staircase wave group. The duration of the staircase wave group corresponds to the time from when the first staircase wave starts to when the last staircase wave ends, both of the staircase waves being included in the staircase wave group, and corresponds to the time during which the staircase wave group lasts. An upper limit of the time between adjacent staircase waves that are included in a single staircase wave group is assumed as L. In the fifth embodiment, multiple staircase waves with time interval between adjacent staircase waves is equal to or less than the upper limit L is assumed as one staircase wave group. Three or more points where the differential values take the predetermined threshold may be included in on staircase wave group. If the time from when the differential value of one staircase wave takes the threshold last to when the differential value of the next staircase wave takes the threshold first exceeds the upper limit L, these two staircase waves are assumed to be included in a different staircase wave group. The duration of a single staircase wave is substantially the same as the time width.

Radiation incident to the radiation detection element 11 can be assumed as random, and thus the probability distribution of the duration can be obtained theoretically or experimentally. As in the first to fourth embodiments, the range in which duration of single staircase waves are included is assumed as a first range. In the case where staircase wave groups whose duration is longer than the upper limit of the first range occur, the staircase wave groups whose duration is included in the first range should also occur with a certain probability. The range in which values of duration not included in the first range can take is divided into multiple second ranges. Based on the ratio between the probability of occurrence of staircase wave groups whose duration is included in any one of the second ranges and the probability of occurrence of staircase wave groups whose duration is included in the first range, a correction factor for correcting the number of staircase waves or staircase wave groups whose duration is included in the first range is evaluated.

Figure 20:
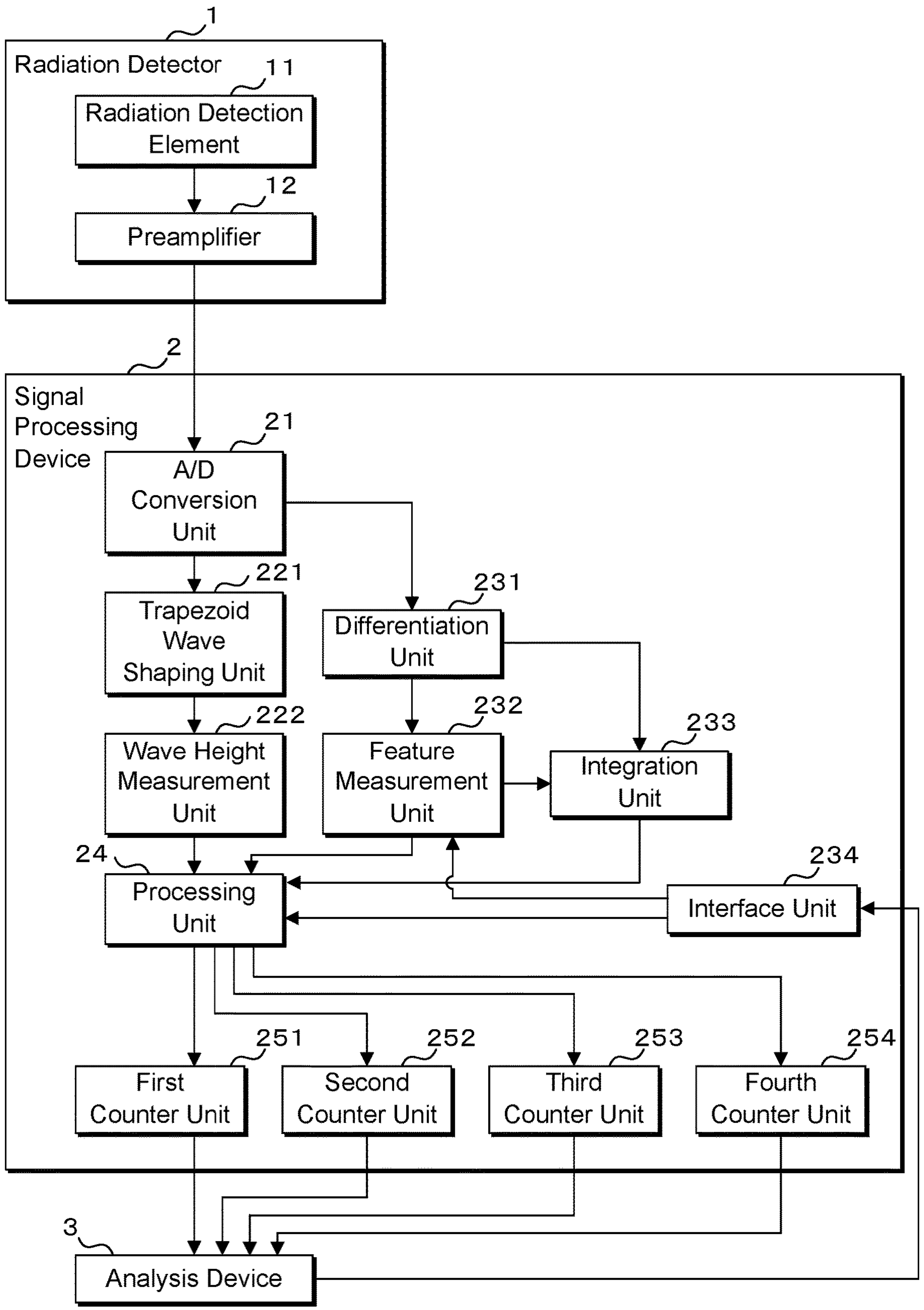
FIG. 20 is a block diagram illustrating a functional configuration of the radiation detector and a signal processing device according to a fifth embodiment.

The configurations of the parts other than a signal processing device 2 of the radiation detection apparatus 10 are similar to those of the first to fourth embodiments. FIG. 20 is a block diagram illustrating a functional configuration of the radiation detector 1 and the signal processing device 2 according to the fifth embodiment. The radiation detector 1 is similar to those in the first to fourth embodiments. The A/D conversion unit 21, the trapezoid wave shaping unit 221, the wave height measurement unit 222 and the differentiation unit 231 that are contained in the signal processing device 2 are the same as those in the third embodiment.

The signal processing device 2 has an interface unit 234. The interface unit 234 is connected to the analysis device 3. The interface unit 234 accepts the upper limit L of the time between the adjacent staircase waves that are included in a single staircase wave group from the analysis device 3. If the counting rate of radiation is high, the number of staircase waves in a signal is increased, and the upper limit L is preferably small. If the counting rate of radiation is low, the number of staircase waves in a signal is low, and the upper limit L is preferably great. The interface unit 234 receives an input of the upper limit L according to the counting rate from the analysis device 3. For example, the user operates the operation unit 35 to input the upper limit L to the analysis device 3, and the analysis device 3 inputs the upper limit L to the interface unit 234. The upper limit L may be input after radiation is measured, and the counting rate is confirmed. The interface unit 234 may receive an input of the upper limit L from the control unit 41.

The interface unit 234 inputs the upper limit L to the feature measurement unit 232 and the processing unit 24. The feature measurement unit 232 receives an input of a signal from the differentiation unit 231 and measures, from the differentiated waveform of a staircase wave or a staircase wave group included in the signal, the duration of the staircase wave or the staircase wave group. As illustrated with reference to FIG. 19, the feature measurement unit 232 generates tangent lines to the differentiated waveform at the point where the differential value of the staircase wave group takes a predetermined threshold first and the point where the differential value takes a threshold last, and calculates the length of time between two points where the tangent lines cross the horizontal axis to measure the duration of the staircase wave or staircase wave group. The feature measurement unit 232 calculates the duration so that the time between the adjacent staircase waves included in a single staircase wave group does not exceed the upper limit L. For example, the feature measurement unit 232 measures the duration from the first staircase wave to the last staircase wave, measures the time elapsed from the last staircase wave, and, if the time elapsed without the next wave exceeds the upper limit L, determines the duration.

The feature measurement unit 232 inputs the calculated duration to the integration unit 233 and the processing unit 24. The integration unit 233 integrates the differential signal input from the differentiation unit 231 over the duration input from the feature measurement unit 232 to calculate the wave height of the staircase wave or the staircase wave group. The integration unit 233 inputs the wave height to the processing unit 24.

The processing unit 24 is connected to the first counter unit 251, the second counter unit 252, the third counter unit 253 and the fourth counter unit 254. The processing unit 24 stores multiple second ranges corresponding to the respective upper limits L. For example, for the respective upper limits L, multiple second ranges that differ from each other are stored. The multiple second ranges for the respective upper limits L are in a one-to-one correspondence with the second counter unit 252, the third counter unit 253 and the fourth counter unit 254. The processing unit 24 determines multiple second ranges to be used in the processing according to the upper limit L input from the interface unit 234.

In the case where the duration measured by the feature measurement unit 232 is included in the first range, the processing unit 24 inputs instructions to the first counter unit 251 to increase the count by one for the wave height measured by the wave height measurement unit 222. In the case where the duration is not included in the first range, the processing unit 24 determines the second range in which the duration is included and inputs instructions to the counter unit corresponding to the second range in which the duration is included to increase the count by one for the wave height measured by the integration unit 233. The first counter unit 251, the second counter unit 252, the third counter unit 253 and the fourth counter unit 254 each make a count according to the input instructions. The signal processing device 2 outputs data indicating the relationship between the wave height of a staircase wave or a staircase wave group and the number of counts counted by the first counter unit 251, the second counter unit 252, the third counter unit 253 and the fourth counter unit 254.

The signal processing device 2 executes the processing of S41 to S47. At S43, the duration of the staircase wave or staircase wave group is measured as a feature. The signal processing device 2 repeatedly executes the processing of S41 to S47. The signal processing device 2 outputs data indicating the relationship between the wave height of a staircase wave or a staircase wave group and the number of counts counted by the first counter unit 251, the second counter unit 252, the third counter unit 253 and the fourth counter unit 254. The analysis device 3 receives an input of data output by the signal processing device 2 and stores the data in the storage unit 34.

The analysis device 3 stores multiple correction factors for respective upper limit values L in the storage unit 34. The analysis device 3 executes processing of S31 to S34. At S32, the arithmetic unit 31 determines the correction factor to be used corresponding to the upper limit L which is the same as the upper limit L input to the signal processing device 2, and calculates a corrected count number $I_C$ by using the determined correction factor as in the third embodiment. At S33, the arithmetic unit 31 generates a second spectrum based on the corrected count number $I_C$ calculated. By the processing of S31 to S34, the analysis device 3 generates the first spectrum and the second spectrum as illustrated in FIG. 13, and displays them on the display unit 44.

In the fifth embodiment as well, the radiation detection apparatus 10 generates the second spectrum in which the effect of staircase wave groups with time widths substantially the same as the time widths of single staircase waves is reduced. The corrected count number $I_C$ is the number obtained by subtracting, from the number of staircase waves or staircase wave groups whose duration is included in the first range, the number of staircase wave groups whose duration is included in the first range that is statistically estimated based on the number of staircase wave groups whose duration is included in the second range. This makes it possible for the radiation detection apparatus 10 to generate the second spectrum from which sum peaks are adequately removed as a spectrum of radiation.

As in the first embodiment 1, the radiation detection apparatus 10 may be configured to correct the number of counts obtained by counting the number of staircase waves or staircase wave groups whose duration is included in the first range every time it is determined that the duration is not included in the first range. Alternatively, as in the fourth embodiment, the radiation detection apparatus 10 may be configured to count radiation by the analysis device 3.

Sixth Embodiment

Figure 21:
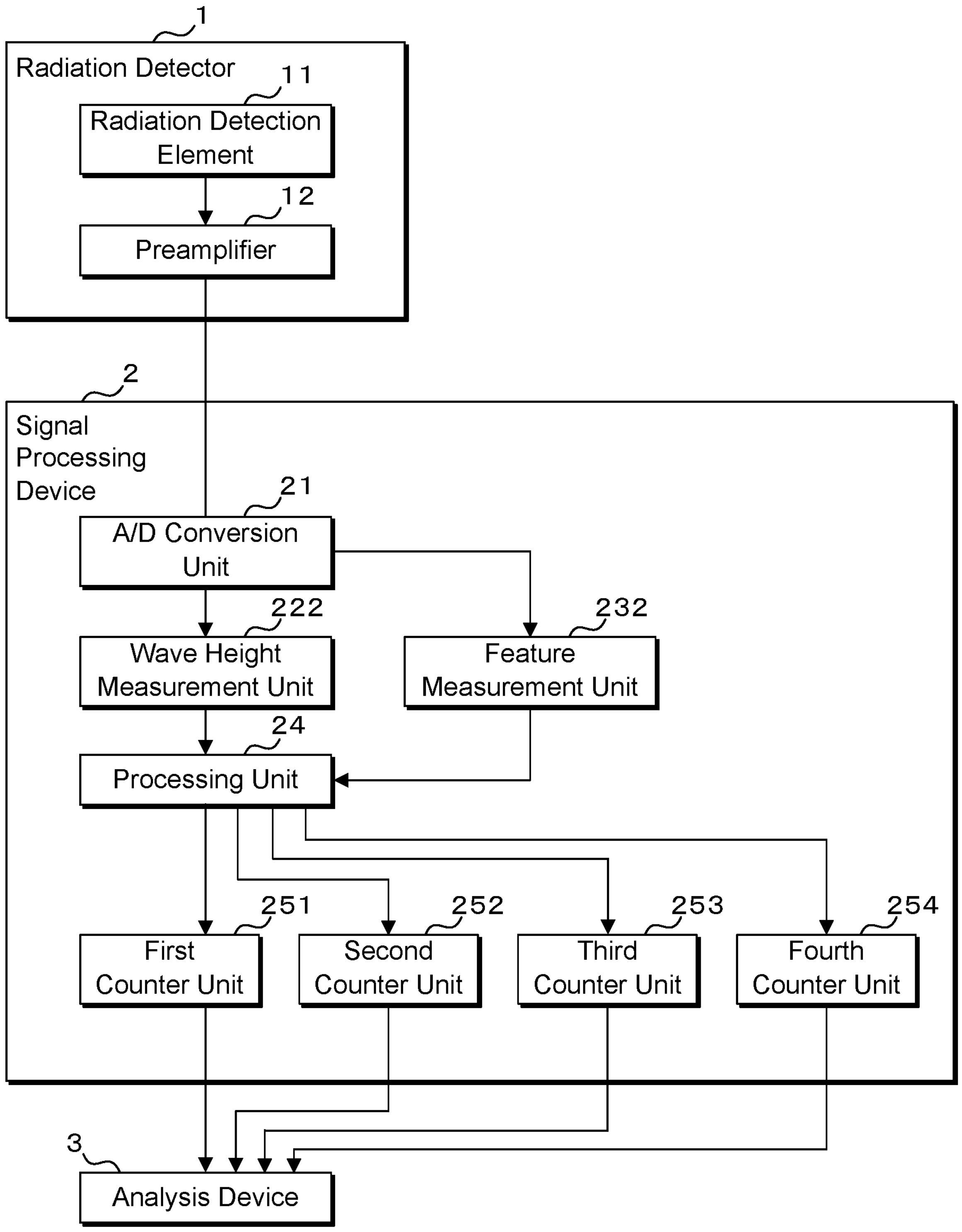
FIG. 21 is a block diagram illustrating a functional configuration of the radiation detector and a signal processing device according to a sixth embodiment.

The first to fifth embodiments depict an example where a staircase wave is used as a response wave. In the sixth embodiment, a pulse wave is used as a response wave. The configurations of the parts other than a radiation detector 1 and a signal processing device 2 of the radiation detection apparatus 10 are similar to those of the first to fifth embodiments. FIG. 21 is a block diagram illustrating a functional configuration of the radiation detector 1 and the signal processing device 2 according to the sixth embodiment. The radiation detection element 11 generates a pulse wave having the wave height corresponding to the energy of radiation every time a single event occurs in which radiation is incident and the radiation is detected. The radiation detection element 11 is a proportional counter tube, for example. The radiation detection element 11 may be a combination of a scintillator and a photomultiplier tube, for example. The pulse wave corresponds to a response wave. The preamplifier 12 amplifies the pulse wave generated by the radiation detection element 11. The radiation detector 1 outputs a signal including the pulse wave. The radiation detector 1 thus generates a pulse wave.

Figure 22:
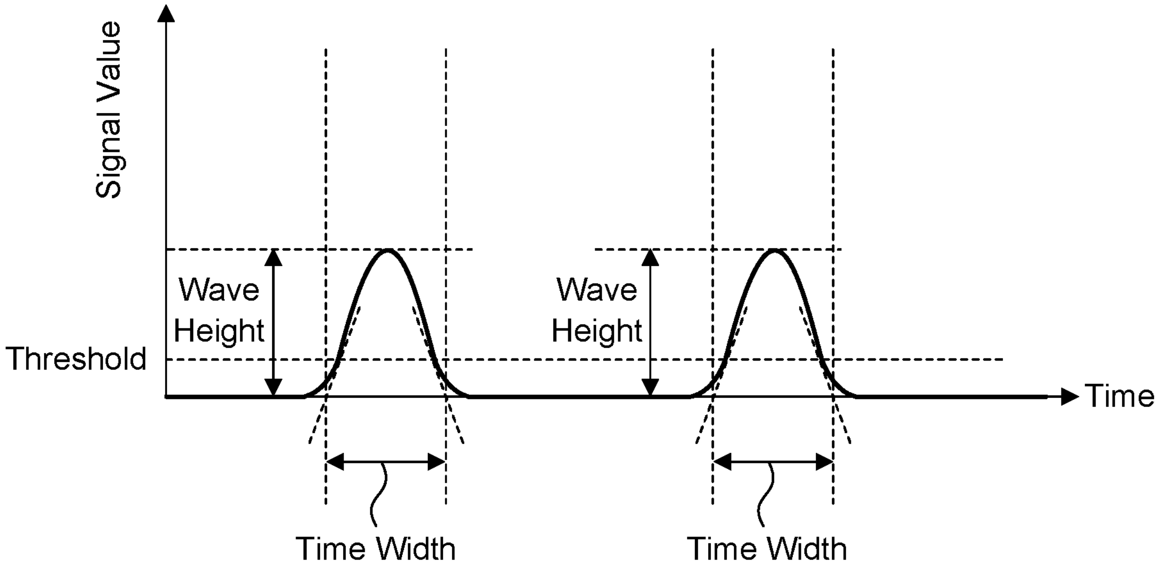
FIG. 22 is a schematic characteristic diagram representing an example of a pulse wave.

FIG. 22 is a schematic characteristic diagram representing an example of a pulse wave. In the drawing, the horizontal axis represents time, and the vertical axis represents a signal value. A pulse wave is a signal that rises from a predetermined signal reference to a peak value and then falls to the signal reference. The signal reference is zero, for example. Every time a single event occurs in which radiation is incident to the radiation detection element 11 and the radiation detection element 11 detects the radiation, the radiation detector 1 outputs one pulse wave where a signal rises and falls once. One pulse wave is generated in response to one event. If multiple events occur, a signal including multiple pulse waves is output. The height from the signal reference to the peak of a pulse wave is assumed as a wave height of the pulse wave. The wave height of the pulse wave corresponds to the energy of the detected radiation.

As illustrated in FIG. 22, tangent lines with respect to a pulse wave at two points where the signal values take a predetermined threshold are generated, and the distance (the length of time) between two points where the two tangent lines cross the horizontal axis (straight line indicating the signal reference) is defined as a time width of the pulse wave. The time width of a pulse wave corresponds to the time during which the pulse wave lasts. The time width varies for different pulse waves and characterizes the pulse waves. Note that the signal processing device 2 may use the distance between the two points where the signal values take a predetermined threshold as a time width of the pulse wave. The signal processing device 2 may use the time width of the pulse wave obtained by another method.

Figure 23:
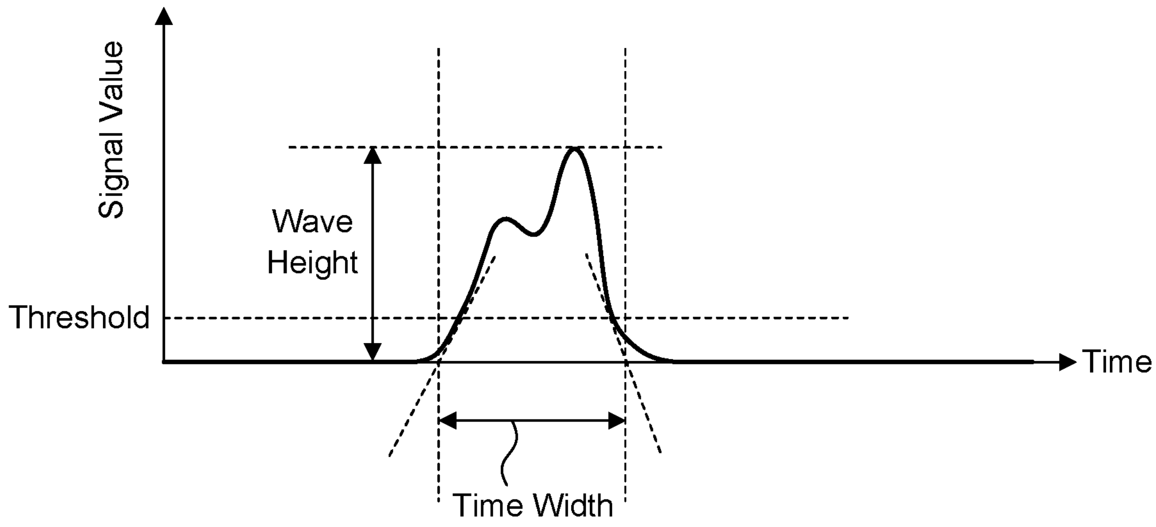
FIG. 23 is a schematic characteristic diagram representing an example of a pulse wave when the interval between events is short.

FIG. 23 is a schematic characteristic diagram representing an example of pulse waves in the case where the interval between events is short. In the drawing, the horizontal axis represents time, and the vertical axis represents a signal value. In the example illustrated in FIG. 23, the interval between events is shorter than that in the example illustrated in FIG. 22. A pulse wave group consisting of multiple pulse waves occurs that have a short interval and overlap with each other. The pulse wave group corresponds to a response wave group. Multiple pulse waves included within an area starting from one point at which the signal value takes a predetermined threshold to the next point where the signal value takes the predetermined threshold are assumed as a single pulse wave group. For example, if the interval between two events is equal to or less than the time width of a single pulse wave, that is, if the interval between adjacent pulse waves is equal to or less than the time width of a single pulse wave, a pulse wave group occurs.

As illustrated in FIG. 23, the height from the signal reference to the peak of the pulse wave group is assumed as a wave height of the pulse wave group. The wave height of the pulse wave group does not correspond to the energy of the detected radiation. As illustrated in FIG. 23, tangent lines with respect to the pulse wave group at two points at which the signal values of the pulse wave group take a predetermined threshold are generated, and the distance (the length of time) between two points where the two tangent lines cross the horizontal axis is defined as the time width of the pulse wave group. The time width of the pulse wave group, which corresponds to the time during which the pulse wave group lasts, is the time length from when the first pulse wave starts to when the last pulse wave ends, both of the pulse waves being included in the pulse wave group. The pulse wave group having a time width substantially the same as that of a single pulse wave, which cannot be discriminated from the single pulse wave based on the time width, is present. As such, signals presumed to consist of single pulse waves include some signals consisting of pulse wave groups.

As illustrated in FIG. 21, the signal processing device 2 is equipped with the A/D conversion unit 21, the wave height measurement unit 222, the feature measurement unit 232, the processing unit 24, the first counter unit 251, the second counter unit 252, the third counter unit 253 and the fourth counter unit 254. The wave height measurement unit 222 and the feature measurement unit 232 are connected to the A/D conversion unit 21. Between the A/D conversion unit 21 and the wave height measurement unit 222 and between the A/D conversion unit 21 and the feature measurement unit 232, a conversion unit that converts the signal so that the distortion of the waveform caused by the signal delay is canceled out and a noise removal unit that removes the noise of the signal may be connected.

The A/D conversion unit 21 receives an input of a signal including a pulse wave from the radiation detector 1 and performs A/D conversion on the signal including the pulse wave. The wave height measurement unit 222 receives an input of the signal from the A/D conversion unit 21, measures the wave height of the pulse wave or pulse wave group included in the signal and inputs the wave height to the processing unit 24. The feature measurement unit 232 receives an input of the signal from the A/D conversion unit 21, and measures the time width of the pulse wave or pulse wave group as the feature of the pulse wave or pulse wave group included in the signal. The feature measurement unit 232 inputs the time width to the processing unit 24.

The processing unit 24 stores information to identify the first range and multiple second ranges in advance. If the time width measured by the feature measurement unit 232 is included in the first range, the processing unit 24 inputs instructions to the first counter unit 251 to increase the count by one for the wave height measured by the wave height measurement unit 222. If the time width is included in the second range related to the double pulse wave group, the processing unit 24 inputs instructions to the second counter unit 252 to increase the count by one for the wave height calculated by the wave height measurement unit 222. If the time width is included in the second range related to the triple pulse wave group, the processing unit 24 inputs instructions to the third counter unit 253 to increase the count by one for the wave height calculated by the wave height measurement unit 222. If the time width is included in the second range related to the quadruple pulse wave group, the processing unit 24 inputs instructions to the fourth counter unit 254 to increase the count by one for the wave height calculated by the wave height measurement unit 222. The first counter unit 251, the second counter unit 252, the third counter unit 253 and the fourth counter unit 254 make a count according to the input instructions.

The signal processing device 2 executes the processing of S41 to S47. At S41, the signal processing device 2 receives an input of the signal including a pulse wave from the radiation detector 1. At S43, the wave height measurement unit 222 measures the wave height of the pulse wave or pulse wave group, and the feature measurement unit 232 measures the time width (feature) of the pulse wave or pulsed waves group. The signal processing device 2 repeatedly executes the processing of S41 to S47. The signal processing device 2 outputs data indicating the relationship between the wave height of the pulse wave or pulse wave group and the number of counts counted by the first counter unit 251, the second counter unit 252, the third counter unit 253 and the fourth counter unit 254. The analysis device 3 receives data output by the signal processing device 2 and stores the data in the storage unit 34.

The analysis device 3 executes the processing of S31 to S34. At S32, the arithmetic unit 31 calculates the correction count $I_C$ using equation (2) as in the third embodiment. The values of the correction factors $k_2$, $k_3$ and $k_4$ are stored in the storage unit 34 in advance. The arithmetic unit 31 calculates the corrected count number $I_C$ using the correction factor stored in the storage unit 34 to correct the number of counts $I_1$ by the first counter unit 251. At step S33, the arithmetic unit 31 generates a second spectrum based on the corrected count number $I_C$ calculated. According to the processing of S31 to S34, the analysis device 3 generates the first spectrum and the second spectrum as illustrated in FIG. 13 and displays them on the display unit 44.

In the sixth embodiment, the radiation detection apparatus 10 generates the second spectrum that is less affected by the influence of the pulse wave groups with time widths substantially the same as the time widths of the single pulse waves as much as possible. The corrected count number $I_C$ is the number obtained by subtracting, from the number of pulse waves or the number of pulse wave groups whose time width is included in the first range, the number of pulse wave groups whose time widths are included in the first range that is statistically estimated based on the number of pulse wave groups whose time widths are included in any of the second ranges. This can make the number of counts of pulse waves responding to the detection of the radiation closer to the true value and can prevents occurrence of sum peaks caused by the pulse wave groups with time widths substantially the same as the time widths of single pulse waves. The radiation detection apparatus 10 can generate the second spectrum from which sum peaks are adequately removed as a spectrum of the radiation. In the sixth embodiment as well, the first spectrum including sum peaks and the second spectrum from which sum peaks are removed can be compared. In addition, a first spectrum as to one energy range and a second spectrum as to another energy range are combined to use a composite spectrum.

As in the fourth embodiment, the radiation detection apparatus 10 may be configured to count radiation by the analysis device 3 without containing the first counter unit 251, the second counter unit 252, the third counter unit 253 and the fourth counter unit 254 in the signal processing device 2. The radiation detection apparatus 10 may be configured to correct the time width as a feature depending on the wave height. Alternatively, as in the fifth embodiment, regarding multiple pulse waves, which have the time between adjacent pulse waves is equal to or less than the upper limit L, as one pulse wave group, the radiation detection apparatus 10 may use the duration of a pulse wave or a pulse wave group as a feature.

Seventh Embodiment

Figure 24:
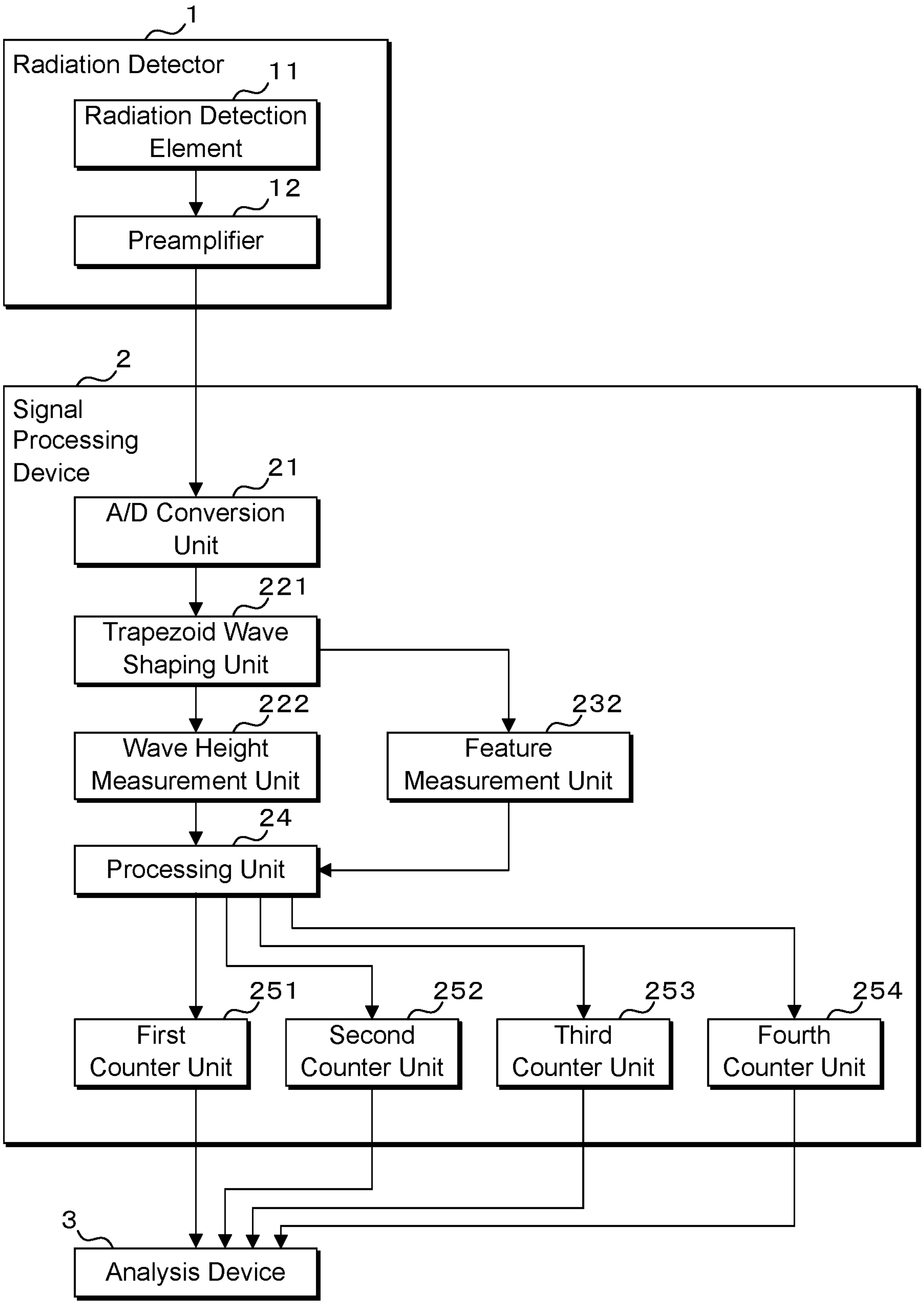
FIG. 24 is a block diagram illustrating a functional configuration of the radiation detector and a signal processing device according to a seventh embodiment.

The seventh embodiment depicts an example where the time width as a feature of a staircase wave or a staircase wave group is calculated in a method different from the method of the first to fifth embodiments. FIG. 24 is a block diagram illustrating a functional configuration of the radiation detector 1 and a signal processing device 2 according to the seventh embodiment. The configurations of the radiation detector 1 and the analysis device 3 are similar to those of the third embodiment. The signal processing device 2 according to the seventh embodiment is not equipped with the differentiation unit 231 and the integration unit 233 unlike the signal processing device 2 according to the third embodiment. The feature measurement unit 232 is connected to the trapezoid wave shaping unit 221. The other configurations of the signal processing device 2 are similar to those in the third embodiment.

The trapezoid wave shaping unit 221 shapes the waveform of the signal input from the A/D conversion unit 21 using a plurality of trapezoid wave shaping filters having different time constants to convert a staircase wave or a staircase wave group included in the signal to a trapezoid wave. The trapezoid wave shaping unit 221 inputs the signal that is shaped using a trapezoid wave shaping filter having a long time constant to the wave height measurement unit 222, and inputs the signal that is shaped using the trapezoid wave shaping filter having a short time constant to the feature measurement unit 232. In other words, the wave height measurement unit 222 receives an input of the trapezoid wave generated using the trapezoid wave shaping filter having a long time constant from the trapezoid wave shaping unit 221. The feature measurement unit 232 receives an input of the trapezoid wave generated using the trapezoid wave shaping filter having a short time constant from the trapezoid wave shaping unit 221.

The wave height measurement unit 222 receives the input from the trapezoid wave shaping unit 221 and measures the wave height of the trapezoid wave generated using the trapezoid wave shaping filter having a long time constant. The feature measurement unit 232 receives the input of the signal including the trapezoid wave generated using the trapezoid wave shaping filter having a short time constant from the trapezoid wave shaping unit 221 and differentiates the input signal to measure the time width.

Figure 25:
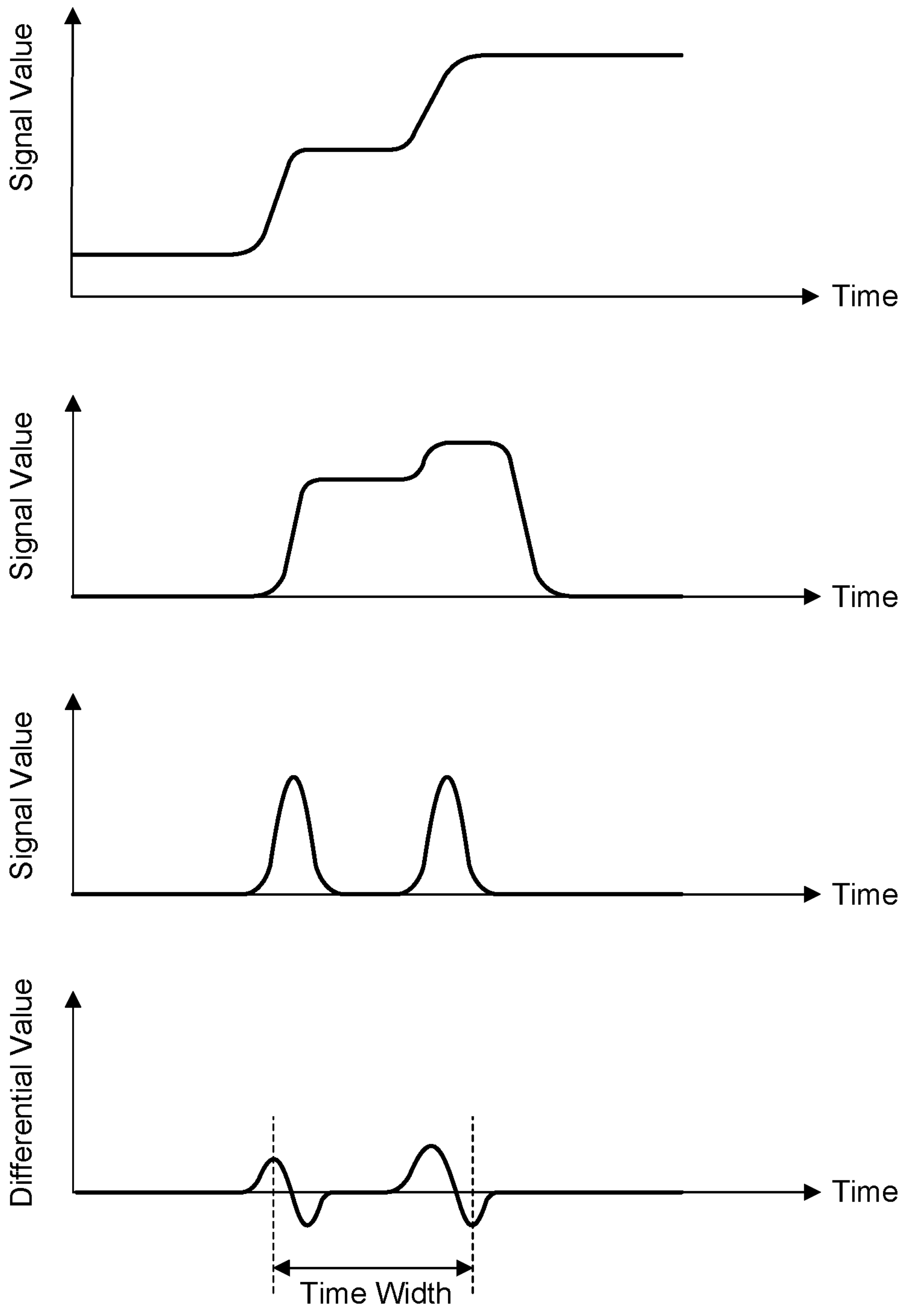
FIG. 25 is schematic graphs representing a staircase wave group, trapezoid waves and an example of waveforms obtained by differentiating the trapezoid wave.

FIG. 25 is schematic graphs representing a staircase wave group, trapezoid waves and an example of a differentiated waveform obtained by differentiating the trapezoid wave. The first graph from the top represents a double staircase wave group, the second graph from the top represents a signal obtained by shaping the signal including the double staircase wave group using the trapezoid wave shaping filter having a long time constant, and the third graph from the top represents a signal obtained by shaping the signal including the double staircase wave group using the trapezoid wave shaping filter having a short time constant. The fourth graph from the top represents a differential signal obtained by differentiating the signal obtained by shaping the signal including the double staircase wave group using the trapezoid wave shaping filter having a short time constant. In the drawing, the horizontal axis represents a time, and the vertical axes of the first, second and third graphs from the top represent a signal value while the vertical axis of the fourth graph from the top represents a differential value.

The wave height measurement unit 222 receives an input of the signal including a trapezoid wave generated using the trapezoid wave shaping filter having a long time constant as illustrated in the second graph from the top and measures the wave height of the trapezoid wave. The feature measurement unit 232 receives an input of the signal including a trapezoid wave generated using the trapezoid wave shaping filter having a short time constant as illustrated in the third graph from the top. In the case where the staircase wave group is a double staircase wave group, two trapezoid waves are included in the signal. Likewise, in the case where the staircase wave group is triple or more staircase wave group, three or more trapezoid waves are included in the signal. If the signal input from the A/D conversion unit 21 to the trapezoid wave shaping unit 221 includes a single staircase wave, a single trapezoid wave is included in the signal input to the feature measurement unit 232.

The feature measurement unit 232 differentiates the input signal to generate a differential signal with a maximum value and a minimum value. In the case where the staircase wave group is a double staircase wave group, a differential signal is generated that has two maximum values and two minimum values as illustrated in the fourth graph from the top. Likewise, in the case where the staircase wave group is triple or more staircase wave group, a differential signal is generated that has three or more maximum values and three or more minimum values. In the case where the signal input from the A/D conversion unit 21 to the trapezoid wave shaping unit 221 includes a single staircase wave, a differential signal is generated that has a single maximum value and a single minimum value.

The feature measurement unit 232 assumes the length of time from the first maximum value to the last minimum value that are contained in the differential signal as a time width, which is a feature of a staircase wave or a staircase wave group. In other words, the feature measuring unit 232 determines the time width by measuring the length of time from the first maximum value to the last minimum value. For example, the feature measurement unit 232 generates a secondary differential signal that is further differentiated from the differential signal, and determines the time width by measuring the length of time from the point where the value of the secondary differential signal is first zero to the point where the value of the secondary differential signal is last zero.

In the first to fifth embodiments, the time width or the duration is measured by generating tangent lines with respect to a differentiated waveform at two points at which the differential values of the staircase wave or the staircase wave group take a predetermined threshold and calculating the distance between two points where the two tangent lines cross the horizontal axis. The time width or the duration calculated by the method described in the first to fifth embodiments are likely to fluctuate depending on the wave height of a staircase wave or a staircase wave group. That is, the time width or the duration calculated by the method described in the first to fifth embodiments is affected by the energy of radiation. The time width measured in the seventh embodiment is unlikely to fluctuate according to the wave height of the staircase wave or the staircase wave group and is unlikely to be affected by the energy of radiation. Accordingly, in the seventh embodiment, the signal processing device 2 can accurately specify the time width without being affected by the energy of the radiation.

As in the third embodiment, the signal processing device 2 executes the processing of S41 to S47. At S43, the feature measurement unit 232 differentiates the signal including the trapezoidal wave generated by using the trapezoidal filter with a short time constant and measures the length of time from the first maximum to the last minimum that are included in the differential signal to determine the time width as described above. At S47, the second counter unit 252, the third counter unit 253 and the fourth counter unit 254 increase the count by one for the wave height measured by the wave height measurement 222. As in the third embodiment, the analysis device 3 executes the processing of S31 to S34. The radiation detection apparatus 10 thus generates the second spectrum from which sum peaks are removed. The radiation detection apparatus 10 according to the seventh embodiment can precisely specify the time width and can generate the second spectrum from which sum peaks are precisely removed.

The measurement method for a time width described in the seventh embodiment may be applied to the first, second, fourth and fifth embodiments. In the example where the measurement method for a time width described in the seventh embodiment is applied to the first, second and fourth embodiments, similarly, the feature measurement unit 232 is connected to the trapezoid wave shaping unit 221, and receives an input of the signal that is shaped using the trapezoidal filter with a short time constant from the trapezoid wave shaping unit 221 to measure the time width. In the example where the measurement method for a time width described in the seventh embodiment is applied to the fifth embodiment, similarly, the feature measurement unit 232 is connected to the trapezoid wave shaping unit 221 and receives an input of the signal that is shaped using the trapezoidal filter with a short time constant from the trapezoid wave shaping unit 221. The feature measurement unit 232 measures the duration of a staircase wave or staircase wave group by measuring the length of time from the first maximum to the last minimum that are included in the differential signal.

In the seventh embodiment, the signal processing device 2 further performs dead time correction processing. Radiation detection takes some time during which other radiation cannot be detected. The processing unit 24 thus performs processing of stopping the processing for detecting radiation for a predetermined time period every time an event of radiation detection by the radiation detection element 11 occurs. The length of time during which the processing unit 24 stops performing processing to detect radiation per event is called dead time. A counting rate of radiation is calculated from the number of times the processing to detect radiation is stopped and the dead time. Since the number of radiation counts decreases by correcting the first count number, the counting rate according to the corrected count number is lower than the counting rate calculated from the dead time. Hence, the processing unit 24 performs dead time correction processing to increase the dead time for the staircase wave group whose time width is included in the second range as the number of counts decreases.

In the case where a staircase wave group whose time width is included in the second range related to the double staircase wave group occurs once, a double staircase wave group whose time width is included in the first range statistically occurs $(-k_2)$ times. Thus, by multiplying the dead time by $(1-k_2)$, the dead time is corrected so as to increase by double staircase wave group whose time width is included in the first range. That is, in the dead time correction processing, in the case where the time width is included in the second range related to the double staircase wave group, the processing unit 24 regards the value obtained by multiplying the dead time of the staircase wave group by $(1-k_2)$ as a corrected dead time.

Likewise, in the dead time correction processing, in the case where the time width is included in the second range related to the triple staircase wave group, the processing unit 24 regards the value obtained by multiplying the dead time of the staircase wave group by $(1-k_3)$ as a corrected dead time. In the case where the time width is included in the second range related to the quadruple staircase wave group, the processing unit 24 regards the value obtained by multiplying the dead time of the staircase wave group by $(1-k_4)$ as a corrected dead time. In the case of taking into account a staircase wave group including five or more overlapping staircase waves as well, the dead time correction can be performed similarly.

The processing unit 24 performs processing of stopping the processing to detect radiation over the corrected dead time every time an event of the radiation detection element 11 detecting radiation occurs. By performing the dead time correction, the radiation detection apparatus 10 can set the dead time more correctly and measure the counting rate of radiation more correctly.

The dead time correction processing described in the seventh embodiment may also be performed in the first to sixth embodiments. In the first to fourth embodiments, the processing unit 24 performs similar dead time correction depending on the second range where the time width of a staircase wave group is included. In the fifth embodiment, the processing unit 24 performs similar dead time correction depending on the duration of the staircase wave group. In the sixth embodiment, the processing unit 24 performs similar dead time correction depending on the time width or duration of a pulse wave group.

Eighth Embodiment

In the first to seventh embodiments, removal of a sum peak is likely to reduce the intensity of peaks included in a spectrum. The eighth embodiment depicts an example where the numbers of counts of the multiple staircase waves that cause occurrence of a staircase wave group whose time width is included in the first range are increased depending on the intensity of the staircase wave group, to recover the intensity of the peaks included in the spectrum of radiation.

The configuration of the radiation detection apparatus 10 according to the eighth embodiment is similar to those in any one of the second to fourth embodiments. The radiation detection apparatus 10 performs similar processing to any one of the second to fourth embodiments. The analysis device 3 stores, for each wave height, the first count number, the second count numbers and the corrected count number $I_C$ which is obtained by correcting the first count number in the storage unit 34. The first count number is the number of counts counted by the first counter unit 251 and the second count numbers are the numbers of counts counted by the second counter unit 252, the third counter unit 253 and the fourth counter unit 254.

Figure 26:
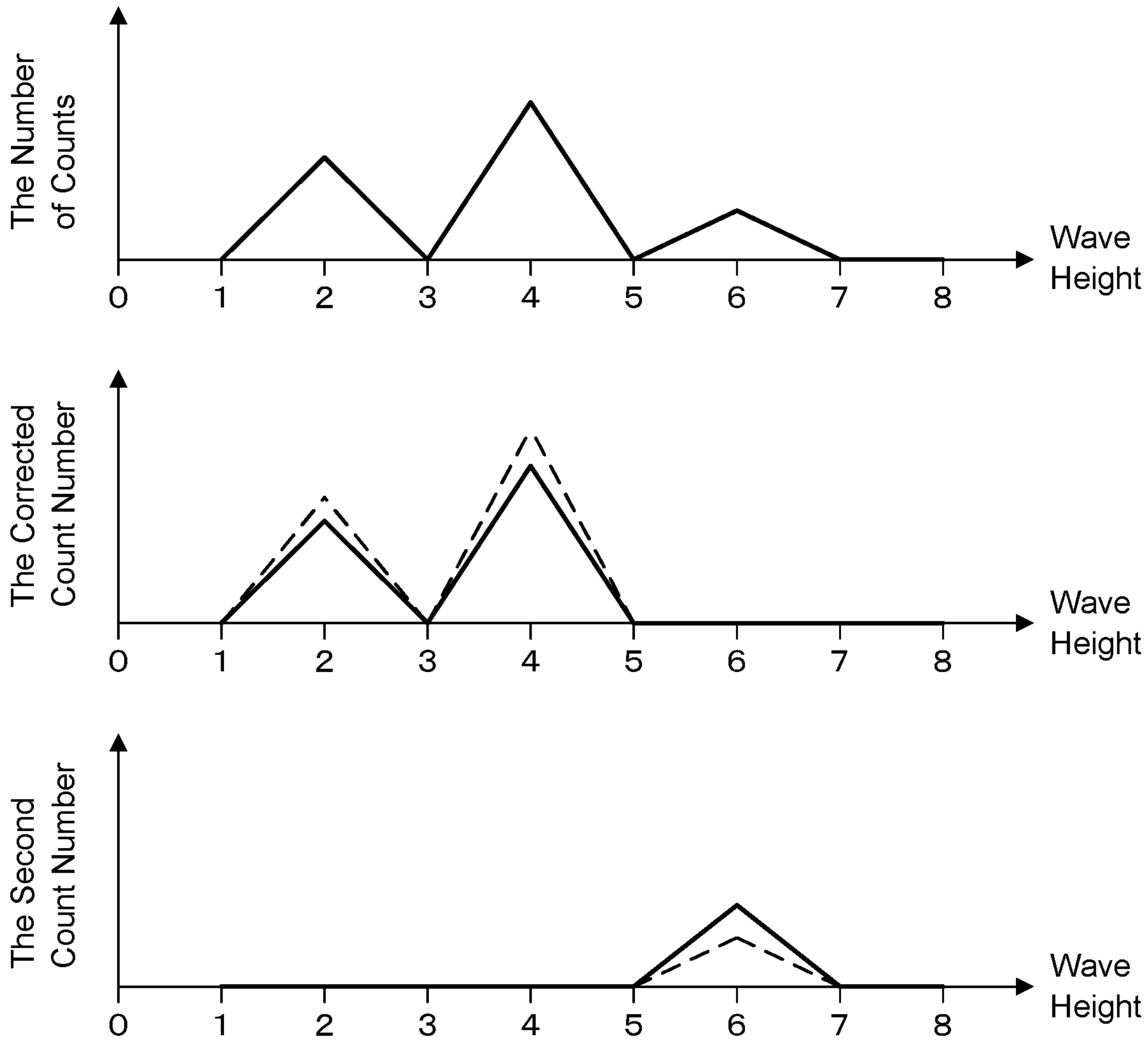
FIG. 26 is a schematic characteristic diagram representing a first spectrum, a second spectrum and an example of the spectrum indicating the relationship between a second count number and a wave height.

FIG. 26 is a schematic characteristic diagram representing a first spectrum, a second spectrum and an example of a spectrum indicating the relationship between the second count number and the wave height. The first graph from the top represents the first spectrum, the second graph from the top represents the second spectrum by the solid line, and the third graph from the top represents a spectrum indicating the relationship between the second count number and the wave height by the solid line. In the drawing, the horizontal axis represents the wave height of a staircase wave. The vertical axis of the first graph from the top represents the number of counts by the first counter unit 251, the vertical axis of the second graph from the top represents the corrected count number $I_C$, and the vertical axis of the third graph from the top represents the second count number. The second count number is the number of counts counted by the second counter unit 252, for example.

The first spectrum in FIG. 26 includes a peak with a wave height of 2, a peak with a wave height of 4 and a peak with a wave height of 6. Here, the peak with a wave height of 6 is assumed as a sum peak, which is caused by a staircase wave group whose time width is included in the first range and which includes a staircase wave with a wave height of 2 and a staircase wave with a wave height of 4. In the case where a staircase wave with a wave height of 2 and a staircase wave with a wave height of 4 occur, a sum peak with a wave height of 4 caused by a staircase wave group including two overlapping staircase waves with a wave height of 2 and a sum peak with a wave height of 8 caused by a staircase wave group including two staircase waves with a wave height of 4 can also occur. In addition, a sum peak caused by a staircase wave group including three or more overlapping staircase waves can also occur. In the example illustrated in FIG. 26, however, for the sake of simplicity, only the sum peak with a wave height of 6 caused by a double staircase wave group in which a staircase wave with a wave height of 2 and a staircase wave with a wave height of 4 overlap is assumed to be taken into account. In the second spectrum, the peak with a wave height of 6 as a sum peak is not included. In the spectrum indicating the relationship between the second count number and the wave height, the peak with a wave height of 6 is present.

Figure 27:
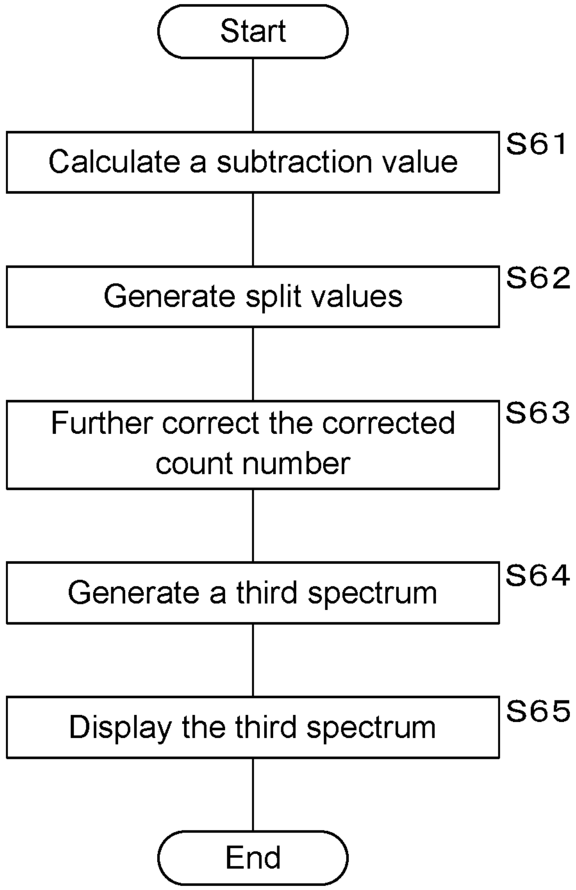
FIG. 27 is a flowchart of a processing procedure for restoring the number of counts or radiation to be executed by the analysis device according to the eighth embodiment.

The analysis device 3 further executes processing of recovering the number of radiation counts. FIG. 27 is a flowchart of a processing procedure for recovering the number of counts of radiation to be executed by the analysis device 3 according to the eighth embodiment. The analysis device 3 calculates a subtraction value obtained by subtracting the corrected count number $I_C$ from the first count number (S61). The subtraction value is an estimated value of the number of staircase wave groups whose time widths are included in the first range and corresponds to the intensity of the sum peak removed by the processing of S31 to S34. If only the double staircase wave group is taken into account, the subtraction value is $(-k_2 I_2)$ according to equation (1). If the staircase wave groups up to the quadruple staircase wave groups are taken into account, the subtraction value is $(-k_2 I_2-k_3 I_3-k_4 I_4)$ according to equation (2). At S61, the arithmetic unit 31 uses the number of counts counted by the second counter unit 252, the third counter unit 253 and the fourth counter unit 254 and the correction factors $k_2$, $k_3$ and $k_4$ to calculate the subtraction value $(-k_2 I_2-k_3 I_3-k_4 I_4)$.

The third graph from the top in FIG. 26 represents the sum peak caused by the staircase wave group whose time width is included in the first range by the dashed lines. The intensity of this sum peak is the subtraction value. From the second count number and the correction factor, the subtraction value can be calculated. At S61, the arithmetic unit 31 calculates the subtraction value for each wave height. Note that at S61, the arithmetic unit 31 may calculate the subtraction value by subtracting the corrected count number $I_C$ from the number of counts counted by the first counter unit 251.

The analysis device 3 then splits the subtraction value for each wave height to generate split values to be assigned to the respective lower wave heights (S62). A sum peak occurs due to the overlapping of multiple staircase waves with wave heights lower than the wave height of the sum peak. In the second spectrum from which the sum peak caused by the staircase wave group whose time width is included in the first range is removed, the intensity of the peaks corresponding to the multiple staircase waves in this staircase wave group is reduced. By splitting the number of counts of staircase wave group whose time width is included in the first range and adding split ones to the wave heights lower than the height of the staircase wave group, the number of counts of the respective staircase waves included in the staircase wave group is increased, which recovers the intensity of the reduced peaks. At S62, the arithmetic unit 31 splits the subtraction value at a certain wave height into multiple split values. The sum of the multiple split values equals the subtraction value. The arithmetic unit 31 assigns the multiple split values to the multiple wave heights lower than said certain wave height. The arithmetic unit 31 determines the split values so that they are proportional to the corrected count numbers $I_C$ at the assigned wave height. The arithmetic unit 31 calculates the split values for the subtraction value at each wave height.

The analysis device 3 then adds each split value to the corrected count number $I_C$ to further correct the corrected count number $I_C$ (S63). At S63, the arithmetic unit 31 adds the multiple split values assigned to the respective wave heights to the corrected count number $I_C$ for the respective wave heights. This increases the number of counts of the staircase waves included in the staircase wave group whose time width is included in the first range. At S62 and S63, the arithmetic unit 31 may calculate the split values based on the subtraction value for each wave height and corrects the corrected count number $I_C$ in order from the lower wave height side (lower energy side) for each wave height. When calculation is performed for one wave height after another wave height, respective split values may be calculated in proportion to the corrected count numbers $I_C$ that have been corrected so far.

The analysis device 3 generates a third spectrum indicating the relationship between the number obtained by correcting the corrected count number $I_C$ and the wave height (S64). At S64, the analysis device 3 stores the number obtained by correcting the corrected count number $I_C$ and the wave height (the energy of the radiation) in association with each other in the storage unit 34 to generate the third spectrum. The second graph from the top in FIG. 26 represents the third spectrum by the dashed lines. The intensity of the peak with a wave height of 6, which is a sum peak, is split into a peak with a wave height of 2 and a peak with a wave height of 4, to thereby increase the intensity of the peak with a wave height of 2 and the peak with a wave height of 4. Since the intensity of the peak with a wave height of 4 is greater than the intensity of the peak with a wave height of 2, the amount of increase for the intensity of a peak with a wave height of 4 is greater than the amount of increase for the intensity of a peak with a wave height of 2.

The analysis device 3 displays the third spectrum (S65). At S65, the arithmetic unit 31 displays the third spectrum on the display unit 44. The arithmetic unit 31 may also display the third spectrum along with the first spectrum and the second spectrum. The arithmetic unit 31 may perform processing of switching between the display of the first spectrum or the second spectrum and the display of the third spectrum. After completion of the processing of S65, the analysis device 3 ends the processing of recovering the number of counts of radiation.

As described in details above, in the eighth embodiment, the radiation detection apparatus 10 adds split values obtained by splitting the subtraction value for respective wave heights corresponding to the number of staircase wave groups whose time width is included in the first range to the corrected count numbers $I_C$ for the lower wave heights. The split values are proportional to the corrected count numbers $I_C$ at multiple wave heights. Depending on the number of staircase wave groups whose time widths are included in the first range, the numbers of multiple staircase waves included in the staircase wave group are increased. The intensity of the peaks included in the spectrum from which the sum peak is removed is recovered by the intensity of the sum peak caused by the staircase wave group whose time width is included in the first range. Thus, the third spectrum increased in the intensity of peak compared to the second spectrum can be obtained.

In the eighth embodiment, the dead-time correction described in the seventh embodiment does not need to be performed. In the eighth embodiment, though the number of counts of radiation decreases by the number of counts of the staircase wave group whose time width is included in the first range, the numbers of counts of staircase waves included in the staircase wave group increase. The counting rate corresponding to the number of counts of radiation thus coincides with the counting rate calculated from the dead time.

The processing for recovering the number of counts of radiation as described in the eighth embodiment may be performed in the fifth or sixth embodiment. In the fifth embodiment, the analysis device 3 increases the numbers of counts of the staircase waves included in this staircase wave group depending on the number of staircase wave group whose duration is included in the first range to recover the intensity of the peaks included in the spectrum of the radiation. In the sixth embodiment, the analysis device 3 increases the numbers of counts of the pulse waves included in this pulse wave group depending on the number of pulse wave group whose time width or duration is included in the first range to recover the intensity of the peaks included in the spectrum of the radiation.

In the second to eighth embodiments, the radiation detection apparatus 10 may be configured to smooth the second count number in a direction in which the wave height varies. For example, the analysis device 3 smooths the second count number using a smoothing filter. Since statistical errors are superimposed on the second count number, correction processing is performed using the smoothed second count number to thereby calculate a corrected count number closer to the true value.

Though staircase waves are used as response waves in the first to eighth embodiments, and a pulse wave is used as a response wave in the sixth embodiment, the signal processing device 2 may be configured to employ another type of a response wave. For example, the signal processing device 2 may employ a response wave having a waveform where the signal value rises when detecting radiation and then decays with a specific time constant similarly to a staircase wave. In this example, the preamplifier 12 outputs a response wave with the above-mentioned shape. The signal processing device 2 is equipped with a filter that shapes the response wave with the above-mentioned shape to a staircase wave between the A/D conversion unit 21 and the trapezoid wave shaping unit 221 or the differentiation unit 231. The signal processing device 2 performs similar processing to the first to fifth, seventh and eighth embodiments using the shaped staircase wave.

Though the signal processing device 2 realizes the function in hardware in the first to eighth embodiments, the signal processing device 2 may be configured to realize a part or all of the function in software. Though the first to eighth embodiments depict examples where radiation is applied to the sample 6 and radiation generated from the sample 6 is detected, the radiation detection apparatus 10 may be configured to detect radiation that is transmitted through the sample 6 or reflected by the sample 6. The radiation detection apparatus 10 may be configured to scan the sample 6 with radiation by changing the direction of the radiation. The radiation detection apparatus 10 may be configured to apply radiation to a moving sample. The radiation detection apparatus 10 may be configured so as not to be provided with the radiation unit 42, the sample stand 5 or the display unit 44.

The matters described in each embodiment can be combined with each other. In addition, independent claims and dependent claims stated in the scope of claims can be combined with each other in any combination, regardless of the citation format. In addition, the scope of claims uses the form of describing claims that depend on two or more other claims (multi-claim format), though not limited to this form. The scope of claims uses the form of describing multiple claims that depend at least one multiple claims (multi-multi claim).

The present invention is not limited to the contents of the embodiment described above, and can be modified in various ways to the extent indicated in the claim. In other words, embodiments obtained by combining technical means that have been changed appropriately within the extent indicated in the claim are also included in the technical scope of the present invention.

It is to be noted that, as used herein and in the appended claims, the singular forms "a", "an", and "the" include plural referents unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A signal processing method for processing a signal including a response wave generated in response to detection of radiation, comprising:

measuring a feature corresponding to a duration of a response wave or a response wave group composed of a plurality of response waves;

counting, for each wave height, the number of response waves or response wave groups whose measured features are included in a predetermined first range in which a feature of a single response wave is included; and performing correction processing of subtracting a specific value from a counted number according to a response wave or a response wave group whose feature is not included in the first range.

2. The signal processing method according to claim 1, wherein the specific value is the number of response wave groups whose features are included in the first range that are present at a predetermined ratio with respect to response wave groups whose features are not included in the first range.

3. The signal processing method according to claim 1, further comprising:

determining whether or not the measured feature is included in the first range;

counting a response wave or a response wave group for each wave height in a case where the measured feature is included in the first range; and performing the correction processing without counting a response wave or the response wave group if a measured feature is not included in the first range.

4. The signal processing method according to claim 1, further comprising:

generating a first count number by counting, for each wave height, a response wave or a response wave group whose feature is included in the first range and not counting a response wave or a response wave group whose feature is not included in the first range;

generating a second count number by counting, for each wave height, a response wave or a response wave group whose feature is included in a second range corresponding to a predetermined time range that starts after a time range corresponding to the first range; and correcting the first count number by adding to the first count number a value obtained by multiplying the second count number by a predetermined correction factor in the correction processing, wherein the correction factor is defined based on a ratio between a probability that a feature of a response wave group is included in the second range and a probability that a feature of a response wave group is included in the first range.

5. The signal processing method according to claim 4, wherein a plurality of the second ranges and the correction factor corresponding to each of the plurality of the second ranges are defined, and the correction factor corresponding to one of the second ranges including the measured feature is used in the correction processing.

6. The signal processing method according to claim 4, further comprising:

generating a first spectrum indicating a relationship between the first count number and a wave height; and generating a second spectrum indicating a relationship between a wave height and a value obtained by correcting the first count number.

7. The signal processing method according to claim 4, further comprising:

calculating, for each wave height, a subtraction value obtained by subtracting a value obtained by correcting the first count number from the first count number;

assigning a plurality of split values obtained by splitting the subtraction value for a certain wave height to a plurality of wave heights lower than that of the certain wave height, each of the split values being a value proportional to a value obtained by correcting the first count number at an assigned wave height;

generating the plurality of split values for the subtraction value at each wave height; and further correcting the first count number by adding the split value to a value obtained by correcting the first count number at the assigned wave height.

8. The signal processing method according to claim 1, wherein the feature is a time width of a response wave or a response wave group.

9. The signal processing method according to claim 1, wherein the feature is a time length from a start of a first response wave included in a response wave group to an end of a last response wave included in the response wave group.

10. The signal processing method according to claim 1, wherein the response wave is a staircase wave or a pulse wave.

11. A signal processing device, comprising:

a feature measurement unit that measures a feature corresponding to a duration of a response wave or a response wave group composed of a plurality of response waves generated in response to detection of radiation; and a processing element, wherein the processing element is operable to:

determine whether or not a measured feature is included in a predetermined first range in which a feature of a single response wave is included; and count, for each wave height, the number of response waves or response wave groups whose features are included in the first range and subtract a specific value from a counted number according to a response wave or a response wave group whose feature is not included in the first range.

12. A radiation detection apparatus, comprising:

a radiation detector that generates a response wave in response to incidence of radiation; and the signal processing device according to claim 11.

13. The radiation detection apparatus according to claim 12, further comprising:

a processor; and a memory, wherein the processor is operable to:

generate a first spectrum indicating a relationship between a wave height and a first count number obtained by counting, for each wave height, the number of response waves or response wave groups whose features are included in the first range; and generate a second spectrum indicating a relationship between a wave height and a value obtained by correcting the first count number by subtracting the specific value.

14. A non-transitory recording medium recording a computer program causing a computer to execute processing of:

acquiring, in the case where a feature corresponding to a duration of a response wave or a response wave group composed of a plurality of response waves generated in response to detection of radiation is included in a predetermined first range in which a feature of a single response wave is included, a first count number generated by counting a response wave or a response wave group for each wave height;

acquiring a second count number obtained by counting, for each wave height, a response wave or a response wave group whose feature is included in a second range corresponding to a predetermined time range that starts after a time range corresponding to the first range; and subtracting the number of response wave groups whose features are included in the first range from the first count number according to the second count number.

* * * * *